United States Patent
Park et al.

(10) Patent No.: US 10,387,098 B2
(45) Date of Patent: Aug. 20, 2019

(54) METHOD FOR PROCESSING INPUTS BETWEEN DEVICES AND ELECTRONIC DEVICE THEREOF

(71) Applicant: Samsung Electronics Co., Ltd., Gyeonggi-do (KR)

(72) Inventors: Nojoon Park, Gyeonggi-do (KR); Yongjoon Jeon, Gyeonggi-do (KR); Geon-Soo Kim, Gyeonggi-do (KR); Kang-Soo Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 207 days.

(21) Appl. No.: 15/160,789

(22) Filed: May 20, 2016

(65) Prior Publication Data

US 2016/0350060 A1 Dec. 1, 2016

(30) Foreign Application Priority Data

May 29, 2015 (KR) ........................ 10-2015-0076159

(51) Int. Cl.
*G06F 3/14* (2006.01)
*G06F 1/16* (2006.01)
(Continued)

(52) U.S. Cl.
CPC ............ *G06F 3/1454* (2013.01); *G06F 1/163* (2013.01); *G06F 3/0231* (2013.01);
(Continued)

(58) Field of Classification Search
CPC ........................... G06F 3/1454; H04M 1/7253
See application file for complete search history.

(56) References Cited

U.S. PATENT DOCUMENTS

2012/0229832 A1* 9/2012 Tsujimoto .......... H04N 1/00244
358/1.13
2013/0024777 A1 1/2013 Brakensiek et al.
(Continued)

FOREIGN PATENT DOCUMENTS

EP 2 800 345 11/2014
EP 2 827 226 1/2015
(Continued)

OTHER PUBLICATIONS

European Search Report dated Sep. 27, 2016 issued in counterpart application No. 16170743.5-1972, 12 pages.
(Continued)

*Primary Examiner* — Scott T Baderman
*Assistant Examiner* — Seung Woon Jung
(74) *Attorney, Agent, or Firm* — The Farrell Law Firm, P.C.

(57) ABSTRACT

The present disclosure provides a wearable device that can be attached to or detached from a user. The wearable device includes a first display having a first size, a processor, and a memory storing instructions thereon that, when executed, allow the processor to display, through the first display, a user interface for obtaining a text input, transmit, to an external device that includes a second display having a second size, a request for obtaining the text input through the external device, receive, from the external device, input information related to the text input obtained through the external device, and display the received input information in the user interface.

17 Claims, 16 Drawing Sheets

(51) Int. Cl.
  *G06F 3/023*    (2006.01)
  *H04M 1/725*   (2006.01)
  *G06F 3/0488*  (2013.01)
  *G06F 3/0484*  (2013.01)
  *G06F 17/24*   (2006.01)
  *G09G 5/12*    (2006.01)
  *H04W 4/02*    (2018.01)
  *H04W 4/12*    (2009.01)
  *H04W 4/70*    (2018.01)
  *H04W 4/80*    (2018.01)

(52) U.S. Cl.
  CPC ........ *G06F 3/0484* (2013.01); *G06F 3/04886* (2013.01); *G06F 3/1423* (2013.01); *G06F 17/24* (2013.01); *H04M 1/7253* (2013.01); *G09G 5/12* (2013.01); *G09G 2340/04* (2013.01); *G09G 2340/145* (2013.01); *G09G 2354/00* (2013.01); *G09G 2370/02* (2013.01); *H04M 2250/22* (2013.01); *H04M 2250/70* (2013.01); *H04W 4/02* (2013.01); *H04W 4/12* (2013.01); *H04W 4/70* (2018.02); *H04W 4/80* (2018.02)

(56) References Cited

U.S. PATENT DOCUMENTS

| | | |
|---|---|---|
| 2013/0219324 A1 | 8/2013 | Seo et al. |
| 2014/0229847 A1 | 8/2014 | Park |
| 2014/0288929 A1* | 9/2014 | Ballinger ................ G10L 15/30 704/235 |
| 2014/0317550 A1* | 10/2014 | Ichiyama ............ G06F 3/04886 715/773 |
| 2014/0320398 A1* | 10/2014 | Papstein ............. H04M 1/7253 345/156 |
| 2015/0022438 A1* | 1/2015 | Hong .................. H04M 1/7253 345/156 |
| 2015/0065893 A1* | 3/2015 | Ye ........................ A61B 5/6898 600/483 |
| 2016/0034178 A1 | 2/2016 | Yoon |

FOREIGN PATENT DOCUMENTS

| | | | |
|---|---|---|---|
| JP | 2012-118880 | 6/2012 | |
| KR | 2010-0072744 | 7/2010 | |
| KR | 10-1195520 | 10/2012 | |
| KR | 2013-0080752 | 7/2013 | |
| WO | WO-2013054957 A1 * | 4/2013 | ........... G06F 1/1684 |

OTHER PUBLICATIONS

European Search Report dated Jun. 28, 2018 issued in counterpart application No. 16170743.5-1216, 10 pages.

\* cited by examiner

METHOD FOR PROCESSING INPUTS BETWEEN DEVICES AND ELECTRONIC DEVICE THEREOF

PRIORITY

This application claims priority under 35 U.S.C. § 119 (a) to Korean Application Serial No. 10-2015-0076159, which was filed in the Korean Intellectual Property Office on May 29, 2015, the entire content of which is incorporated herein by reference.

BACKGROUND

1. Field of the Disclosure

The present invention relates generally to a method for processing inputs between devices and to a device thereof.

2. Description of the Related Art

The advancement of digital technology has allowed electronic devices to adopt various functions, such as photographing, the transmission and reception of e-mails, broadcast reproduction, the Internet, or a messenger, as well as a voice call and a Short Message Service (SMS)/Multimedia Message Service (MMS). For example, wearable devices have been developed recently as a kind of electronic device that can be used while being worn on the body or while being attached to the clothes. Additionally, Internet of Things (IoT) devices have also been developed recently. A disadvantage of both wearable and IoT devices is that they typically have a small screens and/or keypads compared to other electronic devices, such as smart phones or tablet PCs.

In the case where a user must input text into a small screen of an electronic device, it may be difficult for the user to accurately touch the keys on the keypad, thus causing frequent input errors. In order to supplement such a weakness, a network keyboard (e.g., a Bluetooth keyboard) may be utilized, which can be used while being connected to the electronic device. However, it is inconvenient for the user to always carry the network keyboard for text input. In addition, unless the network keyboard is arranged to be side by side with the electronic device, it is difficult to recognize the input text.

Accordingly, there is a need for a more accurate method of entering text into an electronic device having a small screen.

SUMMARY

The present disclosure has been made to address at least the above-mentioned problems and/or disadvantages and to provide at least the advantages described above.

Accordingly, an aspect of the present disclosure is to provide a method and a device that can efficiently input text into a first electronic device having a small screen, by using a second electronic device that includes a larger screen than that of the first electronic device.

Accordingly, another aspect of the present disclosure is to provide a method where a user may efficiently input text into a first electronic device by using a second electronic device that has a larger screen than the first electronic device, where both the first electronic device and the second electronic device display the input text in order to eliminate the inconvenience of the user who inputs the text through a small screen, and to provide the user with a user experience that makes it appear as if the user directly inputs the text into the first electronic device.

Accordingly, another aspect of the present disclosure is to provide a method such that when a first electronic device does not provide a keypad, desired text can be easily input into the first electronic device using a second electronic device in order to improve the usability of the first electronic device.

In accordance with an aspect of the present disclosure, a wearable device that can be attached to or detached from a user is provided. The wearable device includes a first display having a first size, a processor, and a memory storing instructions thereon that when executed, allow the processor to display, through the first display, a user interface for obtaining a text input, transmit, to an external device that includes a second display having a second size, a request for obtaining the text input through the external device, receive, from the external device, input information related to the text input obtained through the external device, and display the received input information in the user interface.

In accordance with another aspect of the present disclosure, an electronic device is provided. The electronic device includes a first display having a first size, a processor, and a memory storing instructions thereon that when executed allow the processor to receive, from an external device that includes a second display having a second size, a request for obtaining a text input and supplementary information related to the text input, display, through the first display, a user interface for obtaining the text input, and in response to receiving input information in the user interface, transmit the received input information to the external device.

In accordance with another aspect of the present disclosure, a method of a wearable device that includes a first display having a first size is provided. The method includes displaying, through the first display, a user interface for obtaining a text input, transmitting, to an external device that includes a second display having a second size, a request for obtaining the text input through the external device, receiving, from the external device, input information related to the text input obtained through the external device, and displaying the received input information in the user interface.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
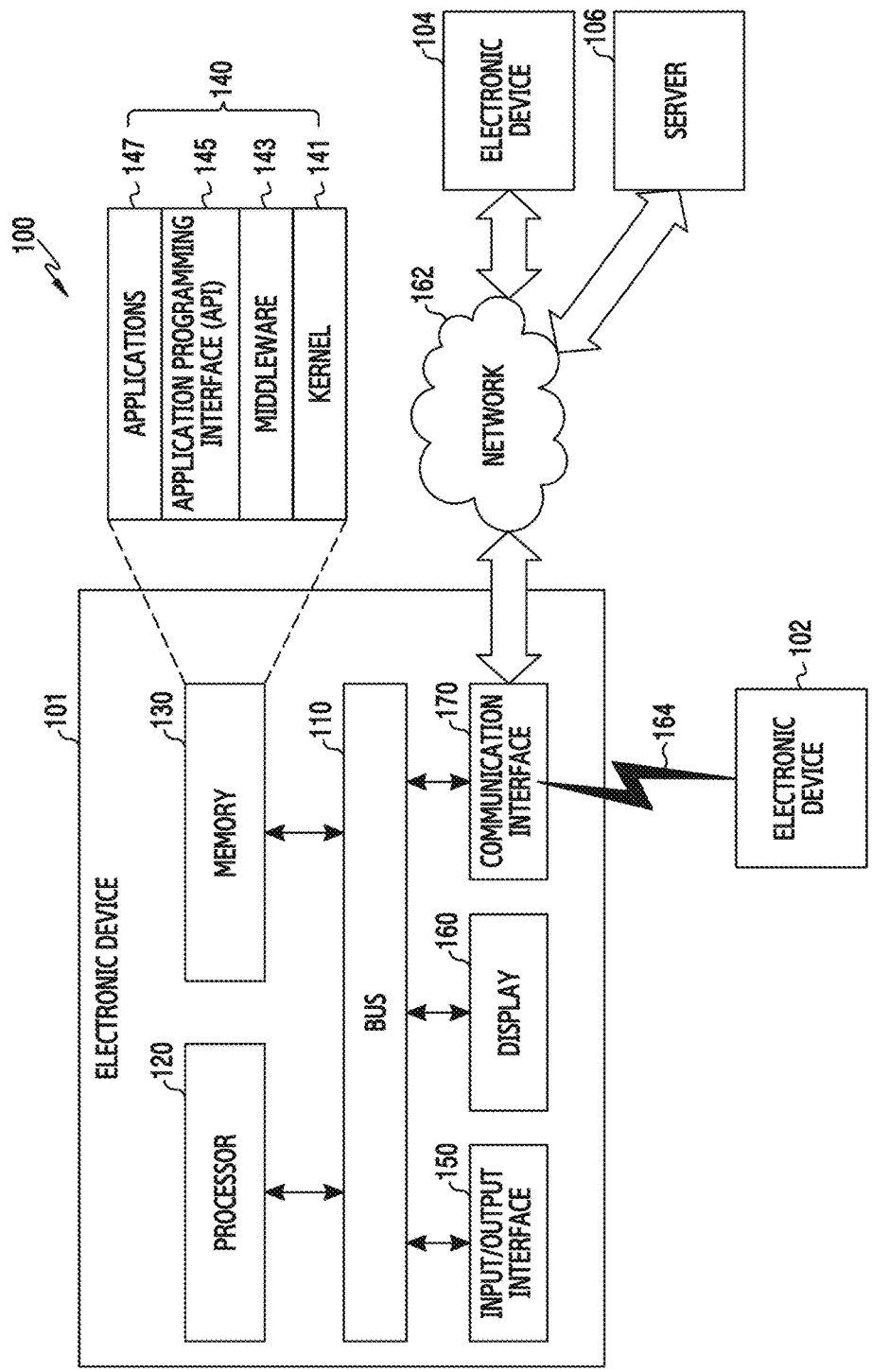
FIG. 1 is a block diagram of a network environment including an electronic device, according to an embodiment of the present disclosure.

Hereinafter, various embodiments of the present disclosure will be described with reference to the accompanying drawings. However, it should be understood that there is no intent to limit the present disclosure to the particular embodiments disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", and "may include" refer to the existence of a corresponding feature (e.g., numeral, function, operation, or constituent element such as component), and do not exclude one or more additional features.

In the present disclosure, the expressions "A or B", "at least one of A or/and B", and "one or more of A or/and B" may include all possible combinations of the items listed. For example, the expressions "A or B", "at least one of A and B", or "at least one of A or B" refer to all of (1) including A, (2) including B, or (3) including all of A and B. The expressions "a first", "a second", "the first", "the second", etc. used herein may modify various components regardless of the order and/or the importance but do not limit the corresponding components. For example, a first user device and a second user device indicate different user devices, although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), the first element may be directly connected or coupled directly to the second element or another element (e g, third element) may be interposed between them. In contrast, when an element (e.g., first element) is referred to as being "directly connected," or "directly coupled" to another element (second element), there are no element (e.g., third element) interposed between the first element and the second element.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well, unless the context clearly indicates otherwise. Unless defined otherwise, all terms used herein, including technical and scientific terms, have the same meanings as those commonly understood by a person skilled in the art to which the present disclosure pertains. Such terms as those defined in a generally used dictionary may be interpreted to have meanings consistent with their contextual meanings in the relevant field of art, and are not to be interpreted to have ideal or excessively formal meanings, unless clearly defined in the present disclosure. In some cases, even terms defined in the present disclosure should not be interpreted to exclude embodiments of the present disclosure.

An electronic device according to various embodiments of the present disclosure may include at least one of a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), a bio-implantable type (e.g., an implantable circuit), and a body-attachable type (e.g., a pager).

According to some embodiments of the present disclosure, the electronic device may be a home appliance. The home appliance may include at least one of a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic device for a ship (e.g., a navigation device for a ship, and a gyro-compass), avionics, a security device, an automotive head unit, a robot for home or industry, an automatic teller machine (ATM) device, a point of sales (POS) device, or IoT device (e.g., a light bulb, various sensors, an electric or gas meter, a sprinkler device, a fire alarm, a thermostat, a streetlamp, a toaster, sporting goods, a hot water tank, a heater, a boiler, etc.).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of new technologies.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a block diagram of a network environment including an electronic device, according to an embodiment of the present disclosure.

Referring to FIG. 1, an electronic device 101 within a network environment 100, is provided. The electronic device 101 includes a bus 110, a processor 120, a memory 130, an input/output interface 150, a display 160, and a communication interface 170. According to an embodiment of the present disclosure, the electronic device 101 may omit at least one of the above components or may further include other components.

The bus 110 is a circuit which interconnects the components 110 to 170 and delivers a communication (e.g., a control message and/or data) between the components 110 to 170.

The processor 120 includes one or more of a Central Processing Unit (CPU), an Application Processor (AP), and a Communication Processor (CP). The processor 120 carries out calculation or data processing relating to control and/or communication of at least one other component of the electronic device 101.

The memory 130 includes a volatile memory and/or a non-volatile memory. The memory 130 stores commands or data relevant to at least one other component of the electronic device 101. The memory 130 stores software and/or a program 140. The program 140 includes a kernel 141, middleware 143, an Application Programming Interface (API) 145, and/or "applications" 147. At least some of the kernel 141, the middleware 143, and the API 145 may be referred to as an Operating System (OS).

The kernel 141 controls or manages system resources (e.g., the bus 110, the processor 120, or the memory 130) used for performing an operation or function implemented in the other programs 140 (e.g., the middleware 143, the API 145, or the applications 147) of the electronic device 101. Furthermore, the kernel 141 may provide an interface through which the middleware 143, the API 145, or the applications 147 may access the individual components of the electronic device 101 to control or manage the system resources.

The middleware 143 serves as an intermediary for allowing the API 145 or the applications 147 to communicate with the kernel 141 to exchange data.

Also, the middleware 143 processes one or more task requests received from the applications 147 according to priorities thereof. For example, the middleware 143 assigns priorities for using the system resources (e.g., the bus 110, the processor 120, the memory 130, etc.) of the electronic device 101, to at least one of the applications 147. For example, the middleware 143 performs scheduling or loading balancing on the one or more task requests by processing the one or more task requests according to the priorities assigned thereto.

The API 145 is an interface through which the applications 147 control functions provided from the kernel 141 or the middleware 143, and includes at least one interface or function (e.g., instruction) for file control, window control, image processing, character control, etc.

The input/output interface 150 functions as an interface that transfers commands or data input from a user or another external device, such as a first external electronic device 102, a second external electronic device 104, or a server 106, to the other elements of the electronic device 101. Furthermore, the input/output interface 150 outputs the commands or data received from the other elements of the electronic device 101 to the user or another external device.

Examples of the display 160 include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 displays various types of contents (e.g., text, images, videos, icons, or symbols) to users. The display 160 may include a touch screen, and may receive a touch, gesture, proximity, or hovering input using an electronic pen or a user's body part.

The communication interface 170 establishes communication between the electronic device 101 and the first external electronic device 102, the second external electronic device 104, or the server 106. For example, the communication interface 170 may be connected to a network 162 through wireless or wired communication, and may communicate with the second external electronic device 104 or the server 106 through the network 162.

The wireless communication may use at least one of Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include short range communication 164. The short-range communication 164 may include at least one of Wi-Fi, Bluetooth, Near Field Communication (NFC), and Global Navigation Satellite System (GNSS). GNSS may include at least one of GPS, global navigation satellite system (Glonass), Beidou Navigation satellite system (Beidou), or Galileo, the European global satellite-based navigation system, based on a location, a bandwidth, etc. Hereinafter, in the present disclosure, the term "GPS" may be interchangeably used with the term "GNSS".

The wired communication may include at least one of a Universal Serial Bus (USB), a High Definition Multimedia Interface (HDMI), Recommended Standard 232 (RS-232), and a Plain Old Telephone Service (POTS).

The network 162 is a telecommunication network, such as a computer network (e.g., a LAN or a WAN), the Internet, and a telephone network.

According to an embodiment of the present disclosure, each of the first and second external electronic devices 102 and 104 may be of a type identical to or different from that of the electronic device 101. The server 106 may include a group of one or more servers.

According to an embodiment of the present disclosure, all or some of the operations performed in the electronic device 101 may be executed in another electronic device or a plurality of electronic devices, e.g., the external electronic devices 102 and 104, or the server 106. In such cases, when the electronic device 101 has to perform some functions or services automatically or in response to a request, the electronic device 101 may request the external electronic devices 102 or 104, or the server 106 to execute at least some functions relating thereto instead of or in addition to autonomously performing the functions or services. In this case, the external electronic device 102 or 104, or the server 106 executes the requested functions or the additional functions, and delivers a result of the execution to the electronic device 101. The electronic device 101 processes the received result as it is or additionally, and provides the requested functions or services. To this end cloud computing, distributed computing, or client-server computing technologies may be used.

Figure 2:
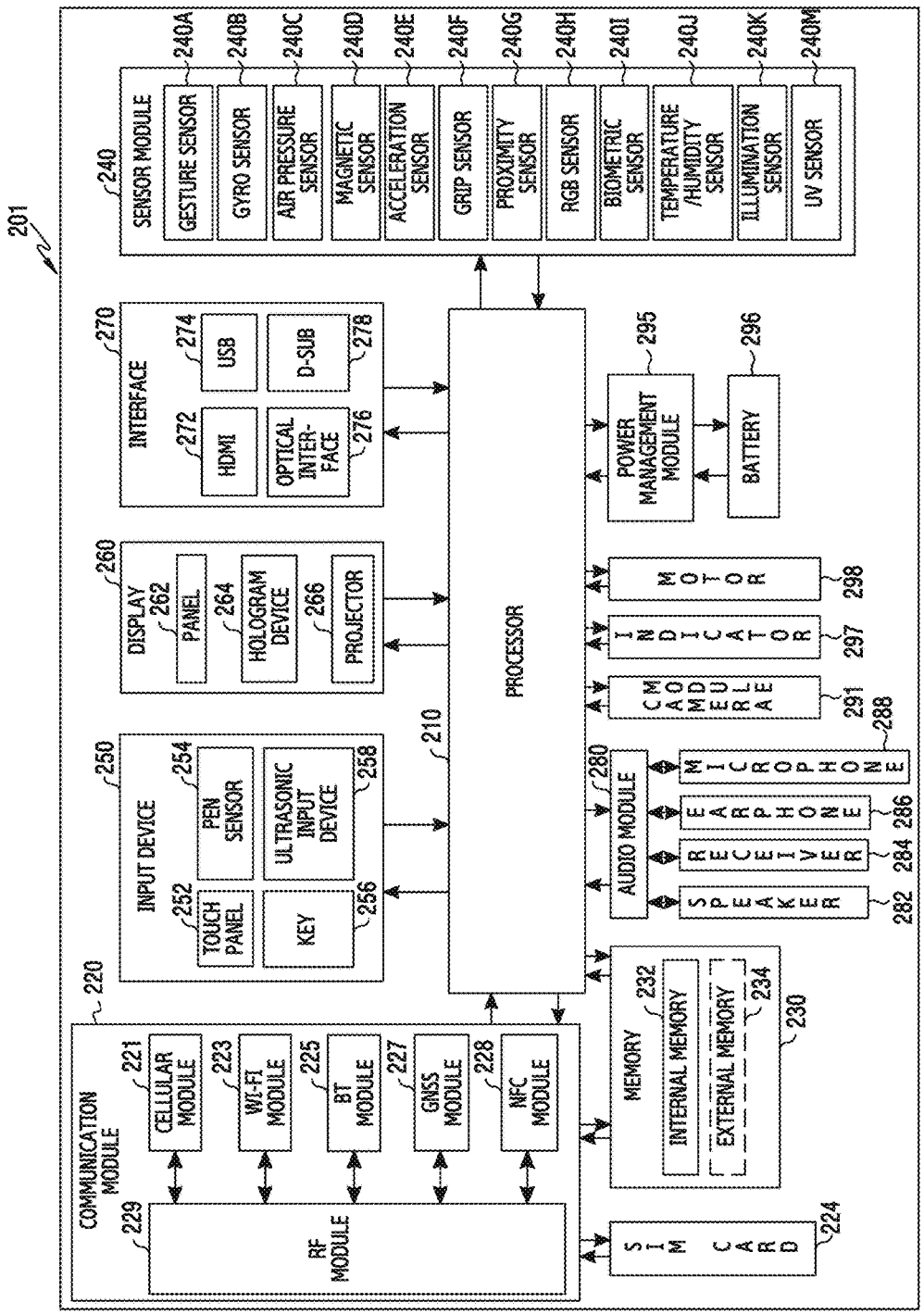
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2, an electronic device 201 is provided. The electronic device 201 may include all or a part of the electronic device 101 shown in FIG. 1. The electronic device 201 includes one or more processors 210 (e.g., Application Processors (AP)), a communication module 220, a memory 230, a sensor module 240, an input device 250, a display 260, an interface 270, an audio module 280, a camera module 291, a power management module 295, a battery 296, an indicator 297, and a motor 298.

The processor 210 controls a plurality of hardware or software components connected to the processor 210 by driving an operating system or an application program, and performs processing of various pieces of data and calculations. The processor 210 may be embodied as a System on Chip (SoC).

According to an embodiment of the present disclosure, the processor 210 may further include a Graphic Processing Unit (GPU) and/or an image signal processor. The processor 210 may include at least some (for example, a cellular module 221) of the components illustrated in FIG. 2.

The processor 210 loads, into a volatile memory, commands or data received from at least one (e.g., a non-volatile memory) of the other components of the electronic device 201 and processes the loaded commands or data, and stores various data in a non-volatile memory.

The communication module 220 may have a configuration equivalent or similar to that of the communication interface 170 of FIG. 1. The communication module 220 may include a cellular module 221, a WiFi module 223, a BT module 225, a GNSS module 227 (e.g., a GPS module, a Glonass module, a Beidou module, or a Galileo module), an NFC module 228, and a Radio Frequency (RF) module 229.

The cellular module 221 provides a voice call, a video call, a text message service, or an Internet service through a communication network. The cellular module 221 may distinguish and authenticate the electronic device 201 in a communication network using a subscriber identification module (SIM) card 224.

According to an embodiment of the present disclosure, the cellular module 221 may perform at least some of the functions that the AP 210 provides. The cellular module 221 may include a communication processor (CP). For example, each of the WiFi module 223, the BT module 225, the GNSS module 227, and the NFC module 228 may include a processor for processing data transmitted/received through a corresponding module. At least some of the cellular module 221, the WiFi module 223, the BT module 225, the GNSS module 227, and the NFC module 228 may be included in one Integrated Chip (IC) or IC package.

The RF module 229 transmits/receives a communication signal (e.g., an RF signal). The RF module 229 may include a transceiver, a Power Amplifier Module (PAM), a frequency filter, a Low Noise Amplifier (LNA), and an antenna.

According to an embodiment of the present disclosure, at least one of the cellular module 221, the WiFi module 223, the BT module 225, the GNSS module 227, and the NFC module 228 may transmit/receive an RF signal through a separate RF module.

The SIM card 224 is a card and/or an embedded SIM containing unique identification information (e.g., an Integrated Circuit Card Identifier (ICCID)) or subscriber information (e.g., an International Mobile Subscriber Identity (IMSI)).

The memory 230 (e.g., the memory 130) may include an embedded memory 232 or an external memory 234.

The embedded memory 232 may include at least one of a volatile memory (e.g., a Dynamic Random Access Memory (DRAM), a Static RAM (SRAM), a Synchronous Dynamic RAM (SDRAM), etc.) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), etc.).

The external memory 234 may include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, etc. The external memory 234 may be functionally and/or physically connected to the electronic device 201 through various interfaces.

The sensor module 240 measures a physical quantity or detects an operation state of the electronic device 201, and may convert the measured or detected information into an electrical signal. The sensor module 240 may include at least one of a gesture sensor 240A, a gyro sensor 240B, an air pressure sensor (barometer) 240C, a magnetic sensor 240D, an acceleration sensor 240E, a grip sensor 240F, a proximity sensor 240G, a red, green, and blue (RGB) sensor 240H, a biometric sensor 240I, a temperature/humidity sensor 240J, an illumination sensor 240K, and a Ultra Violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein.

According to an embodiment of the present disclosure, the electronic device 201 may further include a processor configured to control the sensor module 240, as a part of the processor 210 or separately from the processor 210, and control the sensor module 240 while the processor 210 is in a sleep state.

The input device 250 may include a touch panel 252, a (digital) pen sensor 254, a key 256, or an ultrasonic input device 258.

The touch panel 252 may use at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include a recognition sheet which is a part of the touch panel or is separated from the touch panel.

The key 256 may include a physical button, an optical key, or a keypad.

The ultrasonic input device 258 detects, through a microphone 288, ultrasonic waves generated by an input tool, and identifies data corresponding to the detected ultrasonic waves.

The display 260 (e.g., the display 160 shown in FIG. 1) may include a panel 262, a hologram device 264, or a projector 266.

The panel 262 may include a configuration identical or similar to the display 160 illustrated in FIG. 1. The panel 262 may be implemented to be flexible, transparent, or wearable. The panel 262 may be embodied as a single module with the touch panel 252.

The hologram device 264 shows a three dimensional (3D) image in the air by using an interference of light.

The projector 266 projects light onto a screen to display an image. The screen may be located in the interior of or on the exterior of the electronic device 201.

According to an embodiment of the present disclosure, the display 260 may further include a control circuit for controlling the panel 262, the hologram device 264, or the projector 266.

The interface 270 may include a High-Definition Multimedia Interface (HDMI) 272, a Universal Serial Bus (USB) 274, an optical interface 276, or a D-subminiature (D-sub) 278. The interface 270 may be included in the communication interface 170 illustrated in FIG. 1. Additionally or alternatively, the interface 270 may include a Mobile High-definition Link (MHL) interface, a Secure Digital (SD) card/Multi-Media Card (MMC) interface, or an Infrared Data Association (IrDA) standard interface.

The audio module 280 bilaterally converts a sound and an electrical signal. At least some components of the audio module 280 may be included in the input/output interface 150 illustrated in FIG. 1. The audio module 280 processes voice information input or output through a speaker 282, a receiver 284, earphones 286, or the microphone 288.

The camera module 291 is a device which photographs a still image and a video. The camera module 291 may include one or more image sensors (e.g., a front sensor or a back sensor), a lens, an Image Signal Processor (ISP) or a flash (e.g., LED or xenon lamp).

The power management module 295 manages power of the electronic device 201.

According to an embodiment of the present disclosure, the power management module 295 may include a Power Management Integrated Circuit (PMIC), a charger Integrated Circuit (IC), or a battery gauge. The PMIC may use a wired and/or wireless charging method. Examples of the wireless charging method include a magnetic resonance method, a magnetic induction method, an electromagnetic wave method, etc. Additional circuits (e.g., a coil loop, a resonance circuit, a rectifier, etc.) for wireless charging may be further included.

The battery gauge measures a residual quantity, a voltage, a current, or a temperature while charging of the battery 296. The battery 296 may include a rechargeable battery and/or a solar battery.

The indicator 297 displays a particular state (e.g., a booting state, a message state, a charging state, etc.) of the electronic device 201 or a part (e.g., the processor 210) of the electronic device 201.

The motor 298 converts an electrical signal into a mechanical vibration, and generates a vibration, a haptic effect, etc.

According to an embodiment of the present disclosure, the electronic device 201 may include a processing device (e.g., a GPU) for supporting a mobile TV. The processing device for supporting a mobile TV processes media data according to a certain standard such as Digital Multimedia Broadcasting (DMB), Digital Video Broadcasting (DVB), or mediaFLO™.

According to an embodiment of the present disclosure, each of the above-described component elements of hardware may be configured with one or more components, and the names of the corresponding component elements may vary based on the type of electronic device. The electronic device may include at least one of the above-described elements. Some of the above-described elements may be omitted from the electronic device, or the electronic device may further include additional elements. Also, some of the hardware components may be combined into one entity, which performs functions identical to those of the relevant components before the combination.

Figure 3:
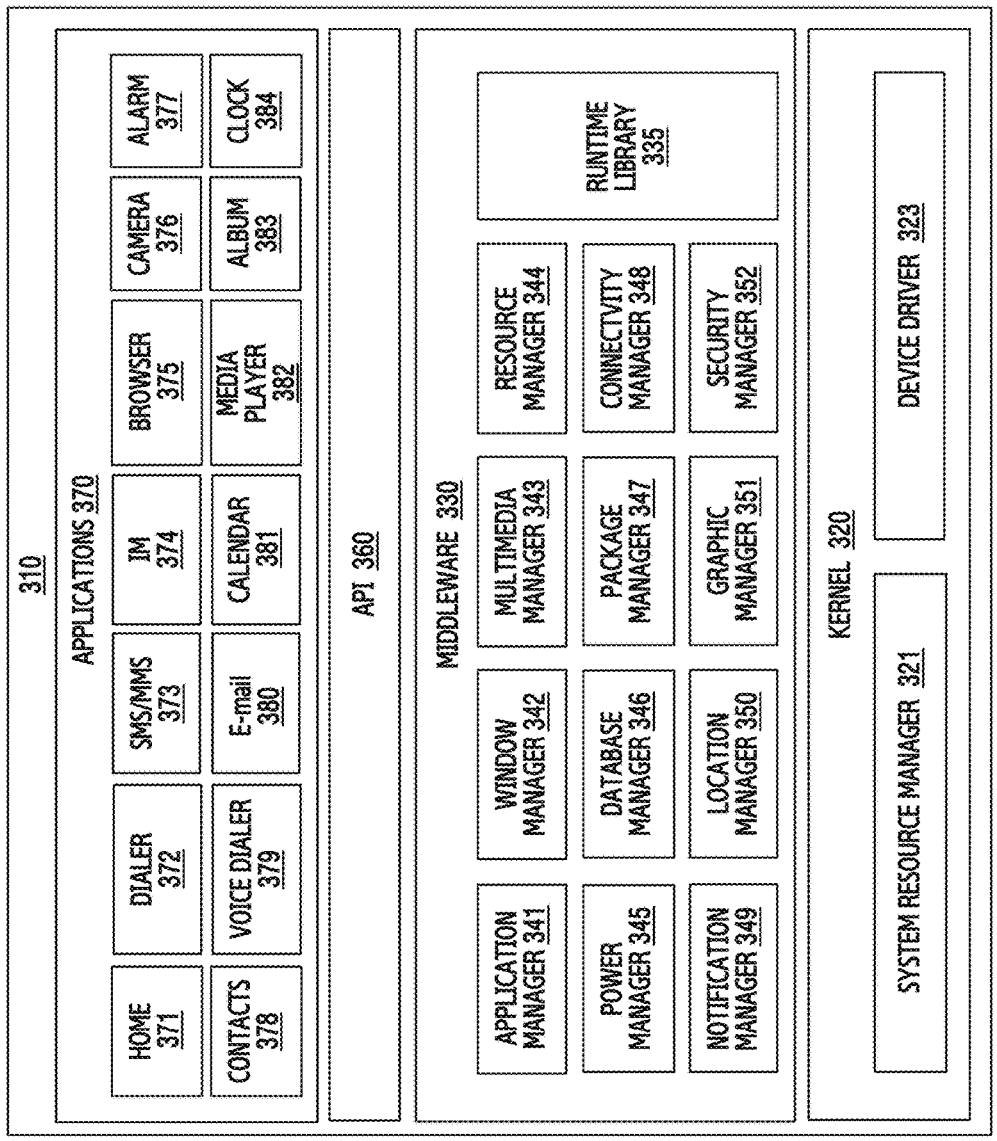
FIG. 3 is a block diagram of a configuration of a program module of an electronic device, according to an embodiment of the present disclosure.

FIG. 3 is a block diagram of a configuration of a program module of an electronic device, according to an embodiment of the present disclosure.

Referring to FIG. 3, a program module 310 is provided. The program module 310 (e.g., the program 140) may include an Operating System (OS) for controlling resources related to the electronic device 101 and/or various applications 147 executed in the operating system. The operating system may be, for example, Android™, iOS™, Windows™, Symbian™, Tizen™, Bada™, etc.

The program module 310 includes a kernel 320, middleware 330, an API 360, and/or applications 370. At least some of the program module 310 may be preloaded on the electronic device 101, or may be downloaded from the electronic device 102 or 104, or the server 106.

The kernel 320 (e.g., the kernel 141) includes a system resource manager 321 and/or a device driver 323.

The system resource manager 321 controls, allocates, or collects system resources. According to an embodiment of the present disclosure, the system resource manager 321 may include a process management unit, a memory management unit, a file system management unit, etc.

The device driver 323 may include a display driver, a camera driver, a Bluetooth driver, a shared memory driver, a USB driver, a keypad driver, a Wi-Fi driver, an audio driver, or an Inter-Process Communication (IPC) driver.

The middleware 330 (e.g., the middleware 143) provides a function commonly required by the applications 370, or provides various functions to the applications 370 through the API 360 so as to enable the applications 370 to efficiently use the limited system resources in the electronic device 101. The middleware 330 may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 is a library module that a compiler uses in order to add a new function through a programming language while an at least one of the applications 370 is being executed. The runtime library 335 performs input/output management, memory management, an arithmetic function, etc.

The application manager 341 manages a life cycle of at least one of the applications 370.

The window manager 342 manages Graphical User Interface (GUI) resources used by a screen of the electronic device 101.

The multimedia manager 343 recognizes a format required for reproduction of various media files, and performs encoding or decoding of a media file by using a codec suitable for the corresponding format.

The resource manager 344 manages resources of a source code, a memory, and a storage space of at least one of the applications 370.

The power manager 345 operates together with a Basic Input/Output System (BIOS) etc. to manage a battery or power source and provides power information required for the operation of the electronic device.

The database manager 346 generates, searches for, and/or changes a database to be used by at least one of the applications 370.

The package manager 347 manages installation or an update of an application distributed in a form of a package file.

The connectivity manager 348 manages wireless connectivity, such as WiFi or Bluetooth.

The notification manager 349 displays or notifies of an event such as an arrival message, appointment, proximity notification, etc. in such a way that does not disturb a user.

The location manager 350 manages location information of the electronic device 101.

The graphic manager 351 manages a graphic effect which will be provided to a user, or a user interface related to the graphic effect.

The security manager 352 provides all security functions required for system security, user authentication, etc.

According to an embodiment of the present disclosure, when the electronic device 101 has a telephone call function, the middleware 330 may further include a telephony manager for managing a voice call function or a video call function of the electronic device.

The middleware 330 may be a module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is a set of API programming functions, and may be provided with a different configuration according to an OS. For example, in the case of Android or iOS, one API set may be provided for each platform. In the case of Tizen, two or more API sets may be provided for each platform.

The applications 370 (e.g., the applications 147) includes one or more applications which provides functions, such as a home 371, a dialer 372, an SMS/MMS 373, an Instant Message (IM) 374, a browser 375, a camera 376, an alarm 377, contacts 378, a voice dialer 379, an email 380, a calendar 381, a media player 382, an album 383, and a clock 384. Additionally, the applications 370 may include a health care application (e.g., measuring exercise quantity or blood sugar), or environmental information application (e.g., providing atmospheric pressure, humidity, or temperature information).

According to an embodiment of the present disclosure, the applications 370 may include an information exchange application that supports exchanging information between the electronic device 101 and the external electronic device 102 or 104. The information exchange application may include a notification relay application for transferring specific information to an external electronic device or a device management application for managing an external electronic device.

The notification relay application includes a function of transferring, to the external electronic device 102 or 104, notification information generated from other applications 370 of the electronic device 101 (e.g., an SMS/MMS application, an e-mail application, a health management application, or an environmental information application). Further, the notification relay application may receive notification information from an external electronic device and provide the received notification information to a user.

The device management application manages (e.g., installs, deletes, or updates) at least one function of the external electronic device 102 or 104 communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance etc.) designated according to attributes of the external electronic device 102 or 104. The applications 370 may include an application received from the external electronic device 102 or 104, or the server 106. The applications 370 may include a preloaded application or a third party application that may be downloaded from the server 106.

According to an embodiment of the present disclosure, the names of the components of the program module 310 of the illustrated embodiment may change according to the type of operating system. At least a part of the programming module 310 may be implemented in software, firmware, hardware, or a combination thereof. At least some of the program module 310 may be implemented (e.g., executed) by the processor 210. At least some of the program module 310 may include a module, a program, a routine, a set of instructions, and/or a process for performing one or more functions.

The term "module" as used herein may mean a unit including one of hardware, software, and firmware or a combination of two or more of them. The term "module" may be interchangeably used with the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

At least some of the electronic devices (for example, modules or functions thereof) or the method (for example, operations) according to the present disclosure may be implemented by a command or instructions stored in a computer-readable storage medium in a programming module form. The instructions, when executed by the processor 120, may cause the one or more processors 210 to execute functions corresponding to the instructions. The computer-readable recoding media may be the memory 130.

The computer-readable storage medium includes a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), etc. In addition, the instructions includes high level language codes, which can be executed in a computer by using an interpreter, as well as machine codes made by a compiler.

Figure 4:
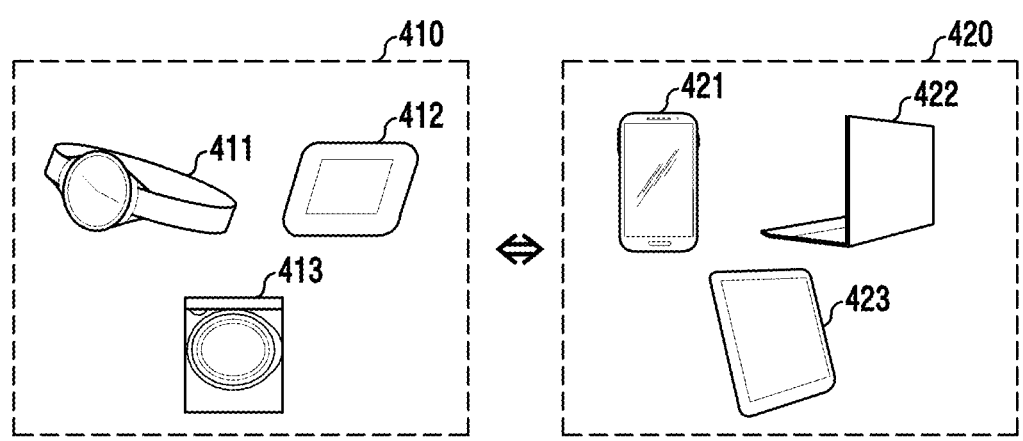
FIG. 4 is illustrate examples of a first electronic device and a second electronic device, according to an embodiment of the present disclosure.

FIG. 4 illustrate examples of a first electronic device and a second electronic device, according to an embodiment.

Referring to FIG. 4, an electronic device having a relatively small screen, such as a wearable device or an IoT device, will be described as a first electronic device 410; while an electronic device having a relatively larger screen, such as a smart phone or a tablet PC, will be described as a second electronic device 420. Either of the first electronic device 410 and the second electronic device 420 may be the electronic device 101 of FIG. 1 or the electronic device 201 of FIG. 2 described above.

The first electronic device 410 may include at least one of an MP3 player, mobile medical equipment, a camera, a wearable device, or a home appliance. For example, the first electronic device 410 may be a smart watch 411, a pager 412, or a washing machine 413. The second electronic device 420 may include at least one of a mobile phone, a video phone, an electronic book reader, a PC, a net-book computer, a workstation, a PDA, a TV set, or a digital signage. For example, the second electronic device may be a smart phone 421, a laptop PC 422, or a tablet PC 423, A wearable device that can be attached to, or detached from, a user, according to an embodiment of the present disclosure, includes a housing; an attachment structure configured to attach the housing to the user; a first display configured to be disposed on one side of the housing and to have a first size; a processor configured to be electrically connected with the first display; and a memory configured to be electrically connected with the processor and to have instructions that, when executed, allow the processor to display, through at least some of the first display, a user interface for obtaining a text input from the user; transmit, to an external device that includes a second display that has a second size larger than the first size, a request for obtaining the text input through the external device; receive, from the external device, input information that is obtained in relation to the text input through the external device; and display the received input information in at least some of the user interface.

The processor may be configured to display a keypad as the user interface.

The processor may be configured to deactivate the keypad and to display the received input information on an input window.

The processor may be configured to transmit the request, including supplementary information, to the external device in response to a user input with respect to the user interface.

The processor may be configured to create the supplementary information, wherein the supplementary information contains at least one of the type of keypad related to text input, the type of input item, keypad language, the security level, the requested text string length, the maximum enterable length, the non-enterable characters, the text that is pre-input into the input window, or information on an application.

The processor may be configured to receive the input information in real time from the external device, or to receive the input information from the external device when the text input is completed.

The processor may be configured to activate a keypad in the user interface when it is determined that the reception of the input information is completed.

The first size of the first display is less than or equal to 2 inches.

An electronic device, according to an embodiment of the present disclosure, includes a housing; a first display configured to be disposed on one side of the housing and to have a first size; a processor configured to be electrically connected with the first display; and a memory configured to be electrically connected with the processor and to have instructions that, when executed, allow the processor to receive, from an external device that includes a second display that has a second size smaller than the first size, a request for obtaining a text input from a user and supplementary information that is related to the text input; display, through at least some of the first display, a user interface for obtaining the text input; and in response to the reception of input information in relation to the user interface, transmit the received input information to the external device.

The supplementary information may contain at least one of the type of keypad related to text input, the type of input item, keypad language, the security level, the requested text string length, the maximum enterable length, the non-enterable characters, the text that is pre-input into the input window, or information on an application The processor may be configured to transmit the input information to the external device whenever a character is input, or to transmit the input information to the external device when the text input is completed.

The processor may be configured to remove the user interface that is displayed on the first display when the text input is completed.

The memory may be configured to store the identification number that is related to the external device, and the processor may be configured to execute an executable application based on the identification number of the external device according to the request, and to transmit at least some data by using the identification number of the external device based on the input information that is received through the user interface.

A system according to an embodiment of the present disclosure includes a first electronic device that includes a first display having a first size and a second electronic device that includes a second display that is larger than the first size, and displays, through at least some of the first display, the first user interface for obtaining a text input from the user; transmits, from the first electronic device to the second electronic device, a request for obtaining the text input through the second electronic device; displays, through at least some of the second display, the second user interface for obtaining the text input; transmits, from the second electronic device to the first electronic device, inputs information that is obtained in relation to the second user interface; and displays the transmitted input information in at least some of the first user interface.

Figure 5:
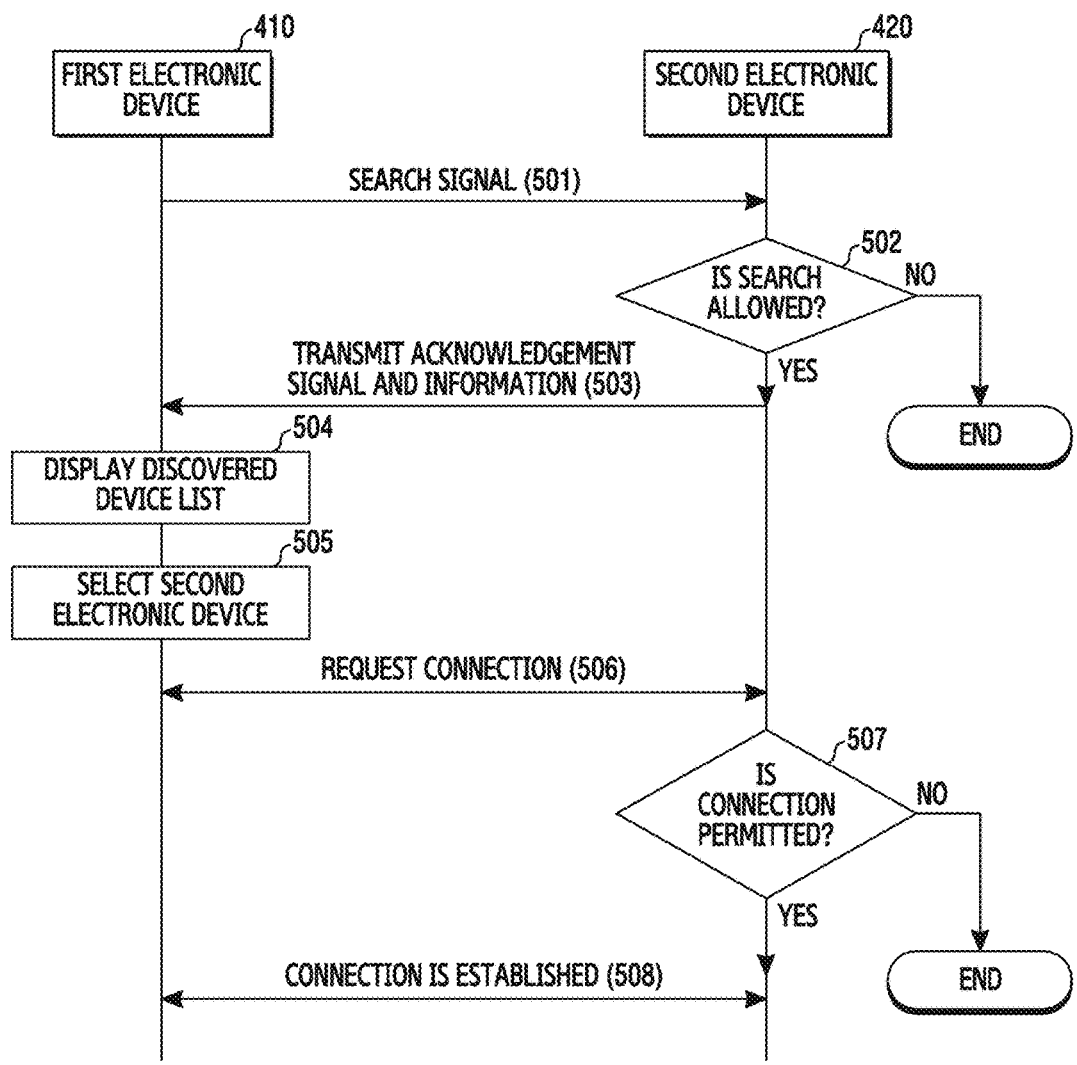
FIG. 5 is a signal flow diagram for a connection method between a first electronic device and a second electronic device, according to an embodiment of the present disclosure.

FIG. 5 is a signal flow diagram for a connection method between a first electronic device and a second electronic device, according to an embodiment of the present disclosure.

Referring to FIG. 5, a method of connecting the first electronic device 410 and the second electronic device 420 is provided. When the user wishes to use the second electronic device 420 in order to input text into the first electronic device 410, the first electronic device 410 and the second electronic device 420 are required to be connected with each other in advance. 'In step 501, the first electronic device 410 transmits search signals to nearby devices. The first electronic device 410 broadcasts the search signals to the nearby devices by using a connectivity technology. For example, the connectivity technology may be Bluetooth, NFC, or WiFi. The search signal contain at least one piece of identification information of the first electronic device 410 (e.g., the device name, the identification number, etc.) or information to check whether or not the device can provide a keypad (e.g., a rule for processing inputs between devices).

In step 502, the second electronic device 420 receives the search signal, and determines whether or not it is allowed to be searched for by other devices. The permission of the search may be configured by the user of the second electronic device 420, or may be configured as a default in the second electronic device 420.

If the second electronic device 420 is able to provide a keypad to the first electronic device 410, the second electronic device 420 recognizes the information that is contained in the search signal as the search signal may contain an item for checking whether or not the input processing method between the devices can be supported. The second electronic device 420 may analyze the search signal in order to determine whether or not at least some of the resources of the second electronic device 420 (e.g., an input method by using a keypad) can be provided to the first electronic device 410, and, if necessary, transmits information of the second electronic device 420 to the first electronic device 410.

If the second electronic device 420 is not allowed to be searched for, the second electronic device 420 may disregard the search signal and end the process. For example, if the second electronic device 420 is not allowed to be searched for, the second electronic device 420 may not respond to the search signal at all. That is, the second electronic device 420 may not send the first electronic device 410 an acknowledgement signal in response to the search signal.

If the second electronic device 420 is allowed to be searched for, then in step 503, the second electronic device 420 transmits an acknowledgement signal and information to the first electronic device 410. The acknowledgement signal is a response to the search signal. The information may contain identification information of the second electronic device 420 (e.g., the device name or the identification number) and functions that can be supported by the second electronic device 420 (e.g., keypad information, a screen size, etc.).

In step 504, the first electronic device 410 displays a list of the devices that are searched for based on the acknowledgement signals transmitted in response to the search signal. Although the acknowledgement is illustrated in FIG. 5 to be received only from the second electronic device 420, the acknowledgement signals can be received from other electronic devices as well as the second electronic device 420. For example, the device list may contain a name, a signal strength, or supportable functions for each device transmitting an acknowledgement signal.

In step 505, the first electronic device 410 selects the second electronic device 420. That is, the user selects one electronic device that the user wishes to access from the device list. For instance, the user of the first electronic device 410 selects the second electronic device 420. Alternatively, in the case where the first electronic device 410 has received the acknowledgement signal only from the second electronic device 420, the first electronic device 410 may select the second electronic device 420 without a user input.

In step 506, the first electronic device 410 makes a request to the second selected electronic device 420 for a connection. When requesting the connection, the first electronic device 410 transmits, to the second electronic device 420, keypad information or a security level of the first electronic device 410. The security level (e.g., high, medium, or low) is information that indicates whether the security of the signal or data, which are transmitted/received between the first electronic device 410 and the second electronic device 420, is high or low.

In step 507, the second electronic device 420 receives the request for the connection, and determines whether or not to permit the connection with the first electronic device 410. The connection may be permitted by the user of the second electronic device 420, or may be permitted according to the configuration in the second electronic device 420.

When the second electronic device 420 permits the connection, then in step 508, the first electronic device 410 and the second electronic device 420 are connected with each other. If the second electronic device 420 permits the connection, the second electronic device 420 may transmit a connection acknowledgement signal to the first electronic device 410.

Figure 6:
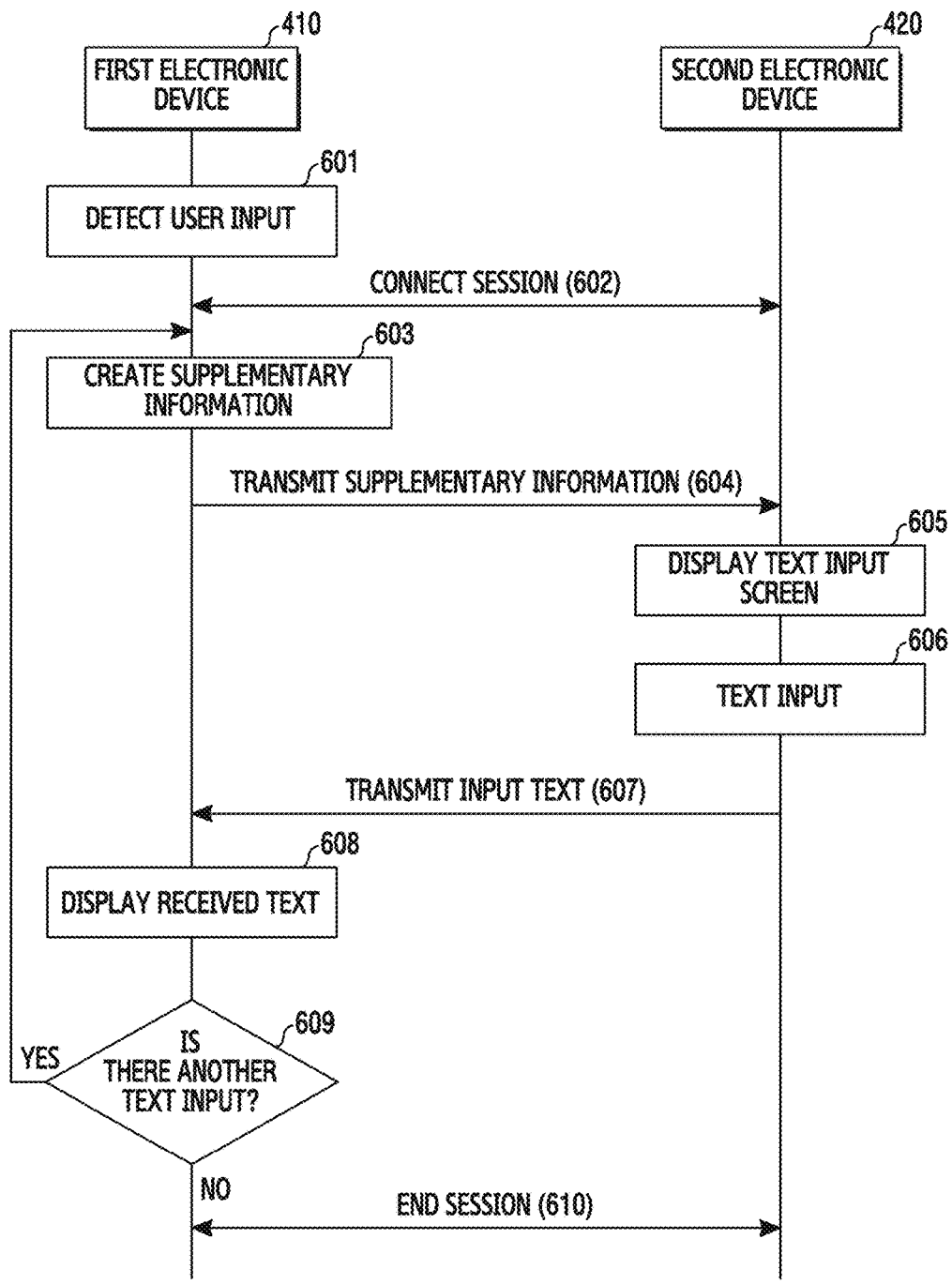
FIG. 6 is a signal flow diagram for a method of processing inputs between a first electronic device and a second electronic device, according to an embodiment of the present disclosure.

FIG. 6 is a signal flow diagram for a method of processing inputs between a first electronic device and a second electronic device, according to an embodiment.

Referring to FIG. 6, a method for processing inputs between the first electronic device 410 and the second electronic device 420 after connection of the devices is established as described in FIG. 5.

In step 601, the first electronic device 410 detects a user input for the text input. The user input is intended to input characters (or text), and the user input may call for a keypad to be displayed on a screen of the first electronic device 410. The user input may be an input by pressing physical buttons or keys provided in the first electronic device 410, or by means of a touch, a gesture, proximity, or hovering with respect to a display unit of the first electronic device 410.

When a user input for the text input is detected, the first electronic device 410 connects a session for the text input with the second electronic device 420 in step 602. The session is different from the operation for the connection between the first electronic device 410 and the second electronic device 420 described with respect to FIG. 5. The session refers to a communication channel or protocol through which the first electronic device 410 and the second electronic device 420 transmit and receive signals when processing the text input. The first electronic device 410 displays an input window and a keypad according to the user input for the text input. The input window is an area in which the input text is displayed. For example, the text that is input through the keypad or the text that is received from the second electronic device 420 is displayed on the input window.

In step 603, the first electronic device 410 creates supplementary information that is related to the text input. The supplementary information may include at least one of the type of keypad (e.g., QWERTY, 3X4, Cheonjiin, numbers, etc.), the type of input item (e.g., telephone numbers, passwords, etc.), keypad language (e.g., English, Korean, etc.), the security level (e.g., high, medium, or low), the requested text string length (e.g., 5 characters), the maximum enterable length (e.g., 10 characters), non-enterable characters, text that is pre-input into the input window, or information on the application.

In step 604, the first electronic device 410 transmits the created supplementary information to the second electronic device 420. After transmitting the supplementary information, the first electronic device 410 may deactivate the keypad that is displayed on the screen of the first electronic device 410. The deactivation may be an operation in which the first electronic device 410 temporarily deactivates or disables the keypad of the first electronic device 410 in order to receive the text input through a keypad of the second electronic device 420. Alternatively, the first electronic device 410 may activate the keypad regardless of the transmission of the supplementary information. In this case, the first electronic device 410 receives the text input through the keypad of the first electronic device 410, as well as the text input through the keypad of the second electronic device 420.

In step 605, the second electronic device 420 receives the supplementary information, and displays a text input screen based on the supplementary information. The text input screen is a user interface screen that includes an input window and a keypad. The second electronic device 420 configures and displays the text input screen based on the supplementary information. For example, if supplementary information indicates that there is text that has been pre-input, the second electronic device 420 configures the pre-input text to be displayed on the input window, and in the case that the supplementary information indicates that the type of keypad is a QWERTY type of keypad, the second electronic device 420 makes a control to display a QWERTY keypad. In addition, the second electronic device 420 may differently configure the size of the input window, the type thereof, and the security level based on the supplementary information.

In step 606, the second electronic device 420 receives a text input. The second electronic device 420 receives the text input by an operation in which the user presses (or touches) the keys on the keypad of the second electronic device 420. When the text is input, the second electronic device 420 displays the input text on the input window of the second electronic device 420. Therefore, the user may see the text that is input into the input window of the second electronic device 420 while inputting the text through the keypad of the second electronic device 420.

In step 607, the second electronic device 420 transmits the input text to the first electronic device 410. The second electronic device 420 may transmit each character to the first electronic device 410 in real time as each character is input, or may transmit the entirety of the input text to the first electronic device 410 when the text input is completed. When transmitting the text, the second electronic device 420 encrypts the text based on the security level that is contained in the supplementary information, and then transmits the encrypted text to the first electronic device 410. When the transmission of the text is completed, the second electronic device 420 removes the user interface screen including the input window and the keypad, so that the interface screen and the keypad are no longer displayed.

In step 608, the first electronic device 410 displays the received text on the input window of the first electronic device 410. Therefore, the first electronic device 410 provides a user experience in which the user feels as if he or she directly inputs the text in the first electronic device 410, even though the user actually inputs the text by using the second electronic device 420. In the case where the received text is encrypted, the first electronic device 410 decrypts the received text to then be displayed on the input window. Also, the first electronic device 410 may activate the keypad of the first electronic device 410 when displaying the received text. That is, the first electronic device 410 may allow additional text to be input through the keypad of the first electronic device 410.

In step 609, the first electronic device 410 determines whether or not there is another text input. Another text input may relate to an additional item in which text is to be input into a page (or content) that is currently displayed on the screen, or a request by the user through the second electronic device 420, for inputting the text. The user's request for the text input may refer to input for moving onto the next input item, such as an Enter key or a Tab key. If there is another text input, the first electronic device 410 returns to and performs step 603.

If there is no text input, then in step 610, the first electronic device 410 terminates the session that has been connected in step 602. In addition, in the case where the first electronic device 410 has deactivated the keypad in step 604, if the text input is completed, the first electronic device 410 activates the keypad. That is, the first electronic device 410 may allow the reception of additional text input through the keypad.

After the session is terminated, the first electronic device 410 stores a history information related to the connection with the second electronic device 420, and thus, may subsequently omit at least some of the connection authentication operation based on the stored history information.

Figure 7:
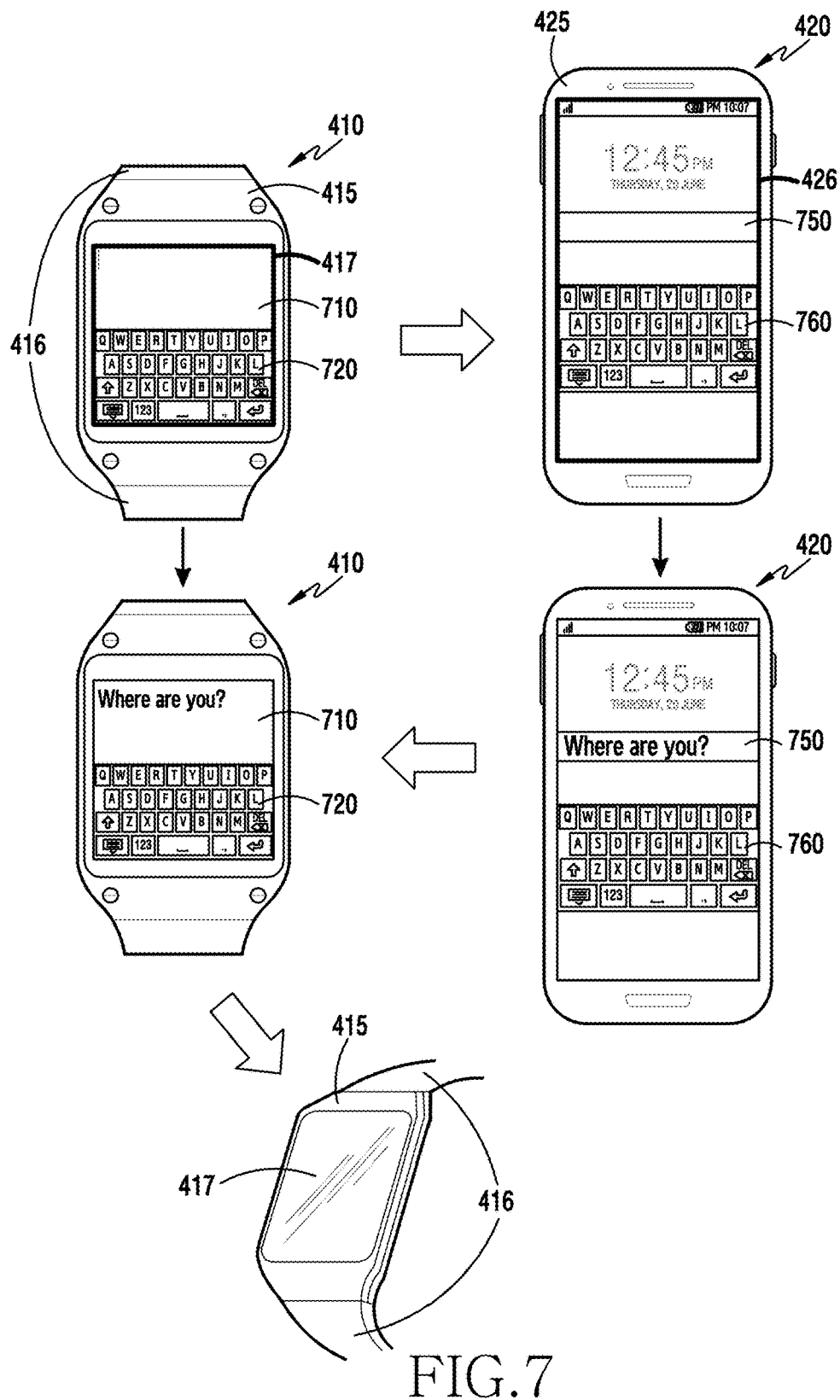
FIG. 7 illustrates a method for inputting text between a first electronic device and a second electronic device, according to an embodiment of the present disclosure.

FIG. 7 illustrates a method for inputting text between a first electronic device and a second electronic device, according to an embodiment of the present disclosure.

Referring to FIG. 7, the first electronic device 410 and the second electronic device 420 are shown. The first electronic device 410 is a wearable device that can be attached to, or detached from, the user, and includes a housing 415, an attachment structure 416 for attaching the housing 415 to the user, and the first display 417 that is disposed on one side of the housing 415 and has the first size. The first display 417 may have a small screen size, for example, a screen which is less than or equal to 2 inches. The second electronic device 420 includes a housing 425 and the second display 426, which has a second size that is greater than the size of the first display 417, on one side of the housing 425.

When a user input for the text input is detected, the first electronic device 410 provides a user interface screen that includes an input window 710 and a keypad 720. Although the user interface screen is illustrated to be a normal input window 710, the input window 710 may vary depending on the information (e.g., applications, pages, content, etc.) that is displayed in the first electronic device 410 when the user input for the text input is detected. According to the configuration of the first electronic device 410, the first electronic device 410 transmits supplementary information, which contains information related to the keypad 720, to the second electronic device 420.

The second electronic device 420 configures a keypad 760 that is similar to, or the same as, the keypad 720 based on the received supplementary information. The second electronic device 420 provides a user interface screen that includes an input window 750 and the configured keypad 760. When the second electronic device 420 receives a text input from the user, the second electronic device 420 transmits the input text to the first electronic device 410.

The second electronic device 420 may transmit a character to the first electronic device 410 as each character is input. For example, the second electronic device 420 transmits the character 'W' to the first electronic device 410 when the character 'W' is input, and transmits the character 'h' to the first electronic device 410 when the character 'h' is input. Subsequently, when the character 'e' is input, the second electronic device 420 transmits the character 'e' to the first electronic device 410. In the case where the second electronic device 420 transmits the character to the first electronic device 410 whenever the character is input, the input window 750 of the second electronic device 420 displays the text to be identical to the text in the input window 710 of the first electronic device 410.

Alternatively, when the text input is complete, the second electronic device 420 transmits, to the first electronic device 410, the entirety of the input text at once. The completion of the text input may be the case where the user presses a "Send button" or a "Done button"; the user presses the Enter key or the Tab key in order to move to the text input item; or the length of the input character string (i.e., the number of characters) is equal to the length of the requested text string (i.e., the number of characters) that is contained in the supplementary information. For example, in the case where the length of the requested text string is five characters, when the number of input characters is equal to five, the second electronic device 420 determines that the text input is complete, and transmits, to the first electronic device 410, the five input characters at once. When the second electronic device 420 transmits the text to the first electronic device 410 after the text input is completed, the text that is displayed on the input window 750 of the second electronic device 420 may be different from the text that is displayed on the input window 710 of the first electronic device 410.

When the input completion is confirmed by the user after a text string "Where are you?" is input, as shown in FIG. 7, the second electronic device 420 transmits, to the first electronic device 410, the text string "Where are you?". After the text string has been transmitted, the text that is displayed on the input window 750 of the second electronic device 420 is the same as the text that is displayed on the input window 710 of the first electronic device 410. The first electronic device 410 may activate the keypad 720 while displaying "Where are you?" on the input window 710.

Figure 8:
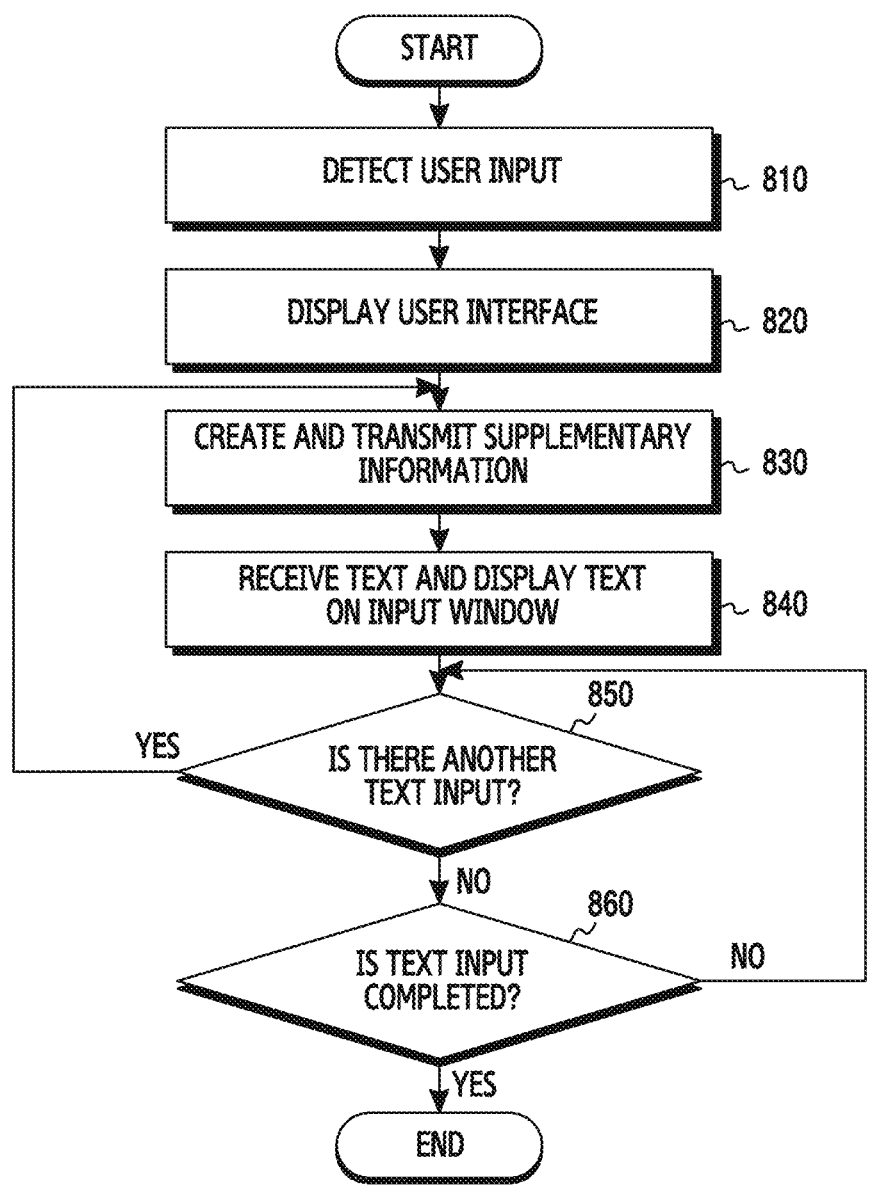
FIG. 8 is a flowchart of a text input method of a first electronic device, according to an embodiment of the present disclosure.

FIG. 8 is a flowchart of a text input method of a first electronic device, according to an embodiment.

Referring to FIG. 8, a method of inputting text into the first electronic device 410 is described. The first electronic device 410 may be the electronic device 101 of FIG. 1 or the electronic device 201 of FIG. 2. FIG. 8 explains the operation performed by the first electronic device 410 from the time when the user input for the text input is detected, as described at step 601 of FIG. 6.

In step 810, the processor 120 detects the user input for the text input. The user input for the text input refers to the case where the user generates an event for inputting the characters (or text). For example, the user input includes the execution of applications (e.g., a call, text, or messenger application) that require the text input; the release of the locked state of the first electronic device 410; or a user input for logging-on to the first electronic device 410.

If the user input is detected, the processor 120 displays a user interface that includes an input window and a keypad in step 820. That is, the processor 120 displays the keypad for the text input of the user on the screen of the first electronic device 410 according to the detection of the user input for the text input. The keypad may be an input method editor (IME) that is provided as a default in the first electronic device 410, or may be an IME that is provided by an executed application.

The user interface may vary depending on the information (e.g., applications, pages, content, etc.) that is displayed in the first electronic device 410 at the time when the user input is detected. For example, if a message application is in progress when the user input is detected, the processor 120 displays a user interface that contains some of the content of a message, an input window, and a keypad. Alternatively, if a call application is in progress when the user input is detected, the processor 120 displays a user interface that contains an input window and a keypad that is comprised of number keys. Alternatively, if there are a plurality of text input items when the user input is detected, the processor 120 displays a user interface that contains a label that is related to one text input item, an input window, and a keypad.

In step 830, the processor 120 creates supplementary information that is related to the text input, and transmits the created supplementary information to the second electronic device 420 through the communication interface 170. When a user's request is received or a predetermined condition is satisfied (e.g., automatically when a text input is received), the processor 120 creates and transmits the supplementary information. For example, when the user selects a specific button (or icon in the screen) that is configured to receive the text input from the second electronic device 420 when providing the keypad, the processor 120 determines that the user's request has occurred. Alternatively, if the processor 120 displays a pop-up window to receive confirmation on whether or not to receive the text input from the second electronic device 420 when providing the keypad, and if the user selects the confirmation (or Yes) in a pop-up window, the processor 120 determines that the user's request has occurred.

Alternatively, the processor 120 determines whether or not it is configured to receive the text input from the second electronic device 420 when providing the keypad to the first electronic device 410 in advance. That is, the processor 120 determines whether or not it is configured to automatically receive the text input from the second electronic device 420 rather than the first electronic device 410 when the text input is received according to a predetermined condition.

The processor 120 may encrypt the supplementary information, and transmits the same to the second electronic device 420 through the communication interface 170. The supplementary information may contain at least one of the type of keypad, the type of input item, keypad language, a security level, a requested text string length, a maximum enterable length, non-enterable characters, text that is pre-input into the input window, or information on the application. The type of keypad may be the type/size of keypad that is displayed in step 820. If the keypad that is displayed in step 820 is the IME that is embedded in the first electronic device 410, the type of keypad may be the type of IME. For example, the type of keypad may be information about whether the keypad displayed in step 820 is a QWERTY keypad, a 3X4 keypad, a Cheonjiin keypad, or a keypad that is comprised only of number keys.

The type of input item is information on what type of item is required to be input. For example, the type of item that is required to be input may be information on whether the text that is required to be input relates to telephone numbers, messages, IDs, or passwords.

The keypad language represents that the keypad displayed in step 820 is configured in English, Korean, Japanese, or Chinese, for example.

The security level is information on whether the security level of the text, which is input based on the type of input item, is high or low. The security level may be variously configured, for example, to three levels (e.g., high/medium/low) or nine levels (e.g., highest/high-medium/high-low/medium-high/medium/medium-low/low-high/low-medium/lowest). The security level may be configured as a default in the first electronic device 410, or may be configured by the user of the first electronic device 410.

For example, in the case where the type of input item is an Internet address or meaningless numbers, the security level may be 'low,' and in the case where the type of input item is a telephone number, the security level may be 'medium'. While in the case where the type of input item is a password, the security level may be 'high'. A protocol for connecting the session between the first electronic device 410 and the second electronic device 420, the need for encryption of the text transmission/reception, or an encryption method thereof may vary depending on the security level.

The requested text string length represents the length of a single input item, or the number of characters of the text string, which is requested in its entirety. The requested text string length may be determined according to the type of input item. For example, if the type of input item is a telephone number, the requested text string length may be comprised of ten characters, and if the type of input item is a password, the requested text string length may be comprised of eight characters. The requested text string length may be used as a criterion for determining whether or not the text input is completed without user input to confirm the completion of the text input.

The maximum enterable length refers to the maximum number of characters that can be input into a single input item. The maximum enterable length may be determined according to the type of input item. For example, if the type of input item is a telephone number, the maximum enterable length may be 10 to 12 characters, and if the type of input item is a password, the maximum enterable length may be 6 to 14 characters.

The non-enterable characters are those characters that cannot be input into the first electronic device 410 or into the input item. The non-enterable characters may be characters that are not contained in the keypad (e.g., IME) provided by the first electronic device 410, or may be determined according to the type of input item. For example, if the type of input item is a telephone number, the non-enterable characters may be characters other than numbers and special symbols (e.g., -, *, etc.). If the type of input item is a password, the non-enterable characters may be letters of languages (such as Korean, Japanese, or Chinese) other than characters in the English alphabet, numbers, and special symbols.

If there is text that has been previously input, the pre-input text may be contained in the supplementary information.

The information on the application is information that is related to the type of keypad, and if the keypad is provided upon the execution of a specific application instead of the IME embedded in the first electronic device 410, it may be contained in the supplementary information. If the keypad is the IME embedded in the first electronic device 410, the information on the application may not be contained in the supplementary information After transmitting the supplementary information to the second electronic device 420, the processor 120 may deactivate the keypad of the first electronic device 410. In the case of deactivating the keypad of the first electronic device 410, the keypad may be temporarily deactivated or disabled for use. Deactivating the keypad prevents the user from inputting undesired text by making the mistake of pressing the keypad of the first electronic device 410 while inputting the text by using the second electronic device 420.

Alternatively, the processor 120 may change the keypad of the first electronic device 410 to another type of keypad without deactivating the keypad. For example, in the case where the keypad of the first electronic device 410 is a QWERTY type, the processor 120 may change the keypad of the first electronic device 410 to a keypad that is comprised of number keys after transmitting the supplementary information. This is intended for the user to input letters in the QWERTY type of keypad by using the second electronic device 420 and to then input numbers by using the first electronic device 410 without changing the keypad of the second electronic device 420 into the number type for the number input.

Alternatively, the processor 120 may not deactivate the keypad of the first electronic device 410 even after transmitting the supplementary information to the second electronic device 420. In this case, the processor 120 may receive the text input through the keypad of the electronic device 410 as well as through the second electronic device 420.

In step 840, the processor 120 receives the text from the second electronic device 420 through the communication interface 170, and displays the received text on the input window. The processor 120 may receive a character in real time whenever the character is input into the second electronic device 420, or may receive the text in its entirety after the text input is completed in the second electronic device 420. If the received text is encrypted, the processor 120 decrypts the received text to then display the same on the input window. The processor 120 may simultaneously activate the keypad of the first electronic device 410 while displaying the text on the input window.

In step 850, the processor 120 determines whether or not there is another text input. The processor 120 determines whether there is still an item that requires a text input in the user interface (e.g., applications, pages, content, etc.) that is currently displayed in the first electronic device 410. Since the type of input item that requires further text input may be different from the type of previous input item, the supplementary information is required to be newly created depending on the type of input item. For example, if the type of the previous input item is an ID, the security level may be 'medium,' the requested text string length may be 6 characters, and the maximum enterable length may be 15 characters. In this case, if the type of the next input item is a password, the security level may be 'high,' the requested text string length may be 8 characters, and the non-enterable characters may be characters of languages other than characters in the English alphabet, numbers, and special symbols. In this case, the processor 120 returns to step 830 to create the supplementary information according to the item that requires the text input, and to transmit the same to the second electronic device 420.

If the length of the received text is the same as the requested text string length, the processor 120 determines whether or not there is another text input without a separate input from the user. If there is another text input, the processor 120 may automatically move a cursor to the next text input item to be displayed in the user interface that is displayed in step 820. For example, in the case where there are three text input items in the user interface that are displayed in step 820, if the text that is input into the first text input item is the same length as the requested text string length, the processor 120 automatically moves the cursor to the second text input item in order to prepare for the text input into the second text input item. If there are a plurality of input items in the user interface, the cursor may act as an indicator that shows what the current input item is, which currently receives the text input. As described above, in the case where there are a plurality of text input items, the first electronic device 410 determines whether or not the length of the received text is the same as the requested text string length, and transmits, to the second electronic device 420, a request for the text input and the supplementary information related to the request even without a separate input from the user.

When a text input request is received from the user through the second electronic device 420, the processor 120 determines that there is another text input. That is, the processor 120 detects whether there is another text input item in the user interface that is displayed in step 820. The text input request refers to the reception of the user input for moving onto the next input item, such as an Enter key or a Tab key. For example, if there are three text input items in the user interface in step 820, the text input into the first text input item may be completed by performing step 830 to step 850 once. If a text input request is received from the user, the processor 120 moves the cursor from the first text input item to the second text input item in order to prepare for the text input into the second text input item. As described above, if there are a plurality of text input items, the first electronic device 410 transmits, to the second electronic device 420, the request for the text input and the supplementary information related to the request whenever the text input request is received.

When the "text input request" is received from the user through the second electronic device 420, the processor 120 may return to step 830 even if there is no item to input the text.

Alternatively, when a "text input completion" selection (e.g., a forced termination or forced completion) is selected by the user, the processor 120 determines that there is no other text input even when there is still remaining items in which to input text.

If there is no other text input, the processor 120 determines whether the text input has been completed in step 860. The user may correct or change the text received from the second electronic device 420. In this case, the processor 120 receives the text through the keypad of the first electronic device 410 in order to correct or change the received text. After the correction or change is complete, "text input completion" is selected by the user, the processor 120 determines that the text input has been completed. Alternatively, if the user selects "text input completion" in step 850, the processor 120 determines that the text input has been completed even without a separate user input. In the case where the keypad of the first electronic device 410 has been deactivated in step 830, the processor 120 activates the keypad after the text input is completed.

When the "text input completion" selection is received from the user through the second electronic device 420 while performing step 860 because there is no item to input the text in step 850, the processor 120 may return to step 850.

Figure 9:
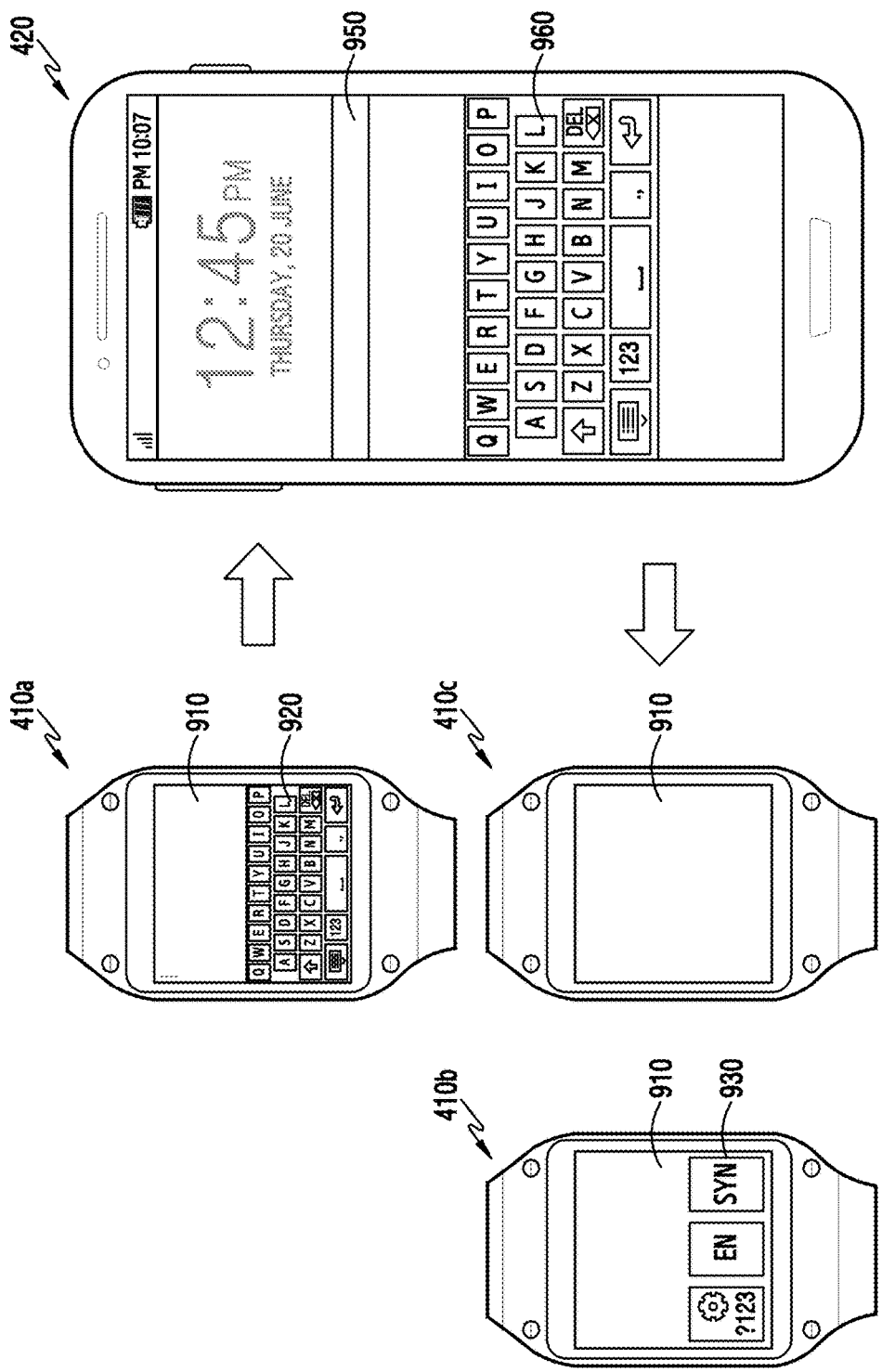
FIG. 9 illustrates a text input screen of a first electronic device, according to an embodiment of the present disclosure.

FIG. 9 illustrates a text input screen of a first electronic device, according to an embodiment of the present disclosure.

Referring to FIG. 9, various configurations of the first electronic device 410, such as first electronic device 410*a*, 410*b*, and 410*c*, and the second electronic device 420 are provided. When performing an input function in the second electronic device 420, the first electronic device 410 may vary the configuration of a screen of the first electronic device 410 to utilize the screen space as much as possible.

For example, the first electronic device 410*a* displays a keypad 920 that is different from the keypad 960 of the second electronic device 420. While the keypad 960 is comprised of numbers and letters of the English alphabet, the keypad 920 of the first electronic device 410 may be comprised of only letters of the English alphabet. When the keypad 960 of the second electronic device 420 is the QWERTY type of keypad, the keypad 920 of the first electronic device 410*a* may be comprised of at least some of the numbers or the special symbols. In this case, the user may input the letters of the QWERTY type of keypad by using the second electronic device 420, and then may easily input the numbers by using the keypad 920 of the first electronic device 410*a* without changing the keypad of the second electronic device 420 into the number type of keypad for inputting the numbers.

Alternatively, the first electronic device 410*b* displays the input window 910 to be relatively large, which is different from the input window 910 of the first electronic device 410*a*, and may display, as a keypad, a type change button (or icon) 930, which supports the keypad 960 of the second electronic device 420. For example, the type change button 930 includes a symbol switching button, a multi-language switching button, a configuration button, or a button for the Enter processing. The first electronic device 410*b* may display the text, which is input through the large input window 910, to be large and, thus, the user may easily recognize the input text. In addition, the user may change the type of keypad 960 of the second electronic device 420 through the type change button 930. Whenever the user presses the type change button 930, the first electronic device 410*b* transmits, to the second electronic device 420, information about the type of keypad that is to be changed. The second electronic device 420 may change the keypad 960 according to the change in the type of keypad.

Alternatively, the first electronic device 410*c* displays the entire screen area as the input window 910 without displaying the keypad. The user may easily recognize the input text through the entire screen area.

Figure 10:
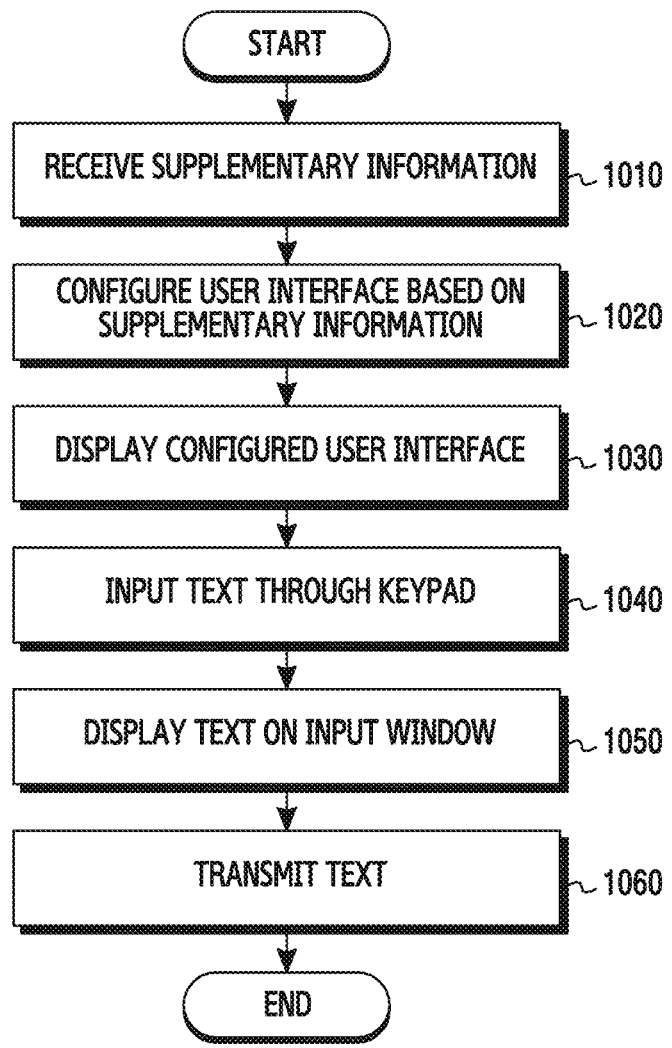
FIG. 10 is a flowchart of a text input method of a second electronic device, according to an embodiment of the present disclosure.

FIG. 10 is a flowchart of a text input method of a second electronic device, according to an embodiment of the present disclosure.

Referring to FIG. 10, the second electronic device 420 may be the electronic device 101 of FIG. 1 or the electronic device 201 of FIG. 2. FIG. 10 explains the operation performed by the second electronic device 420 after the connection of the session described in step 602 of FIG. 6.

Referring to FIG. 10, in step 1010, the processor 120 receives the supplementary information from the first electronic device 410 through the communication interface 170. The supplementary information may contain at least one of the type of keypad related to the first electronic device 410, the type of input item, keypad languages, the security level, the requested text string length, the maximum enterable length, the non-enterable characters, the text that is pre-input into the input window, or information on the application. Since the supplementary information has been described with respect to FIG. 8, the additional description will be omitted here.

In step 1020, the processor 120 configures the input window and the keypad based on the supplementary information. The processor 120 configures the keypad in the same, or a similar, type as the type of keypad contained in the supplementary information. For example, if the type of keypad contained in the supplementary information is a "3*4 keypad," the processor 120 configures the 3*4 type of keypad. Alternatively, if the language contained in the supplementary information is "English," the processor 120 configures the keypad in "English." Alternatively, if the type of input item contained in the supplementary information is a "password," the processor 120 configures the "password" type of input window. In the case of configuring the "password" type of input window, if characters are input, the processor 120 displays at least one of the special symbols (e.g., * or #) regardless of the input characters.

The processor 120 may configure a different type of keypad from the type of keypad that is contained in the supplementary information. For example, if the type of keypad contained in the supplementary information is a "3*4 keypad," the processor 120 configures the "QWERTY type" of keypad. Alternatively, if the language contained in the supplementary information is "English," the processor 120 configures the keypad in "Korean" or with "numbers."

If the processor 120 is not able to support the keypad according to the type of keypad or the type of input item, which is contained in the supplementary information, the processor 120 configures the keypad that is set to be a default in the second electronic device 420. Alternatively, the processor 120 may not permit input processing through the second electronic device 420 according to the user's configuration or a predetermined condition.

If the supplementary information contains information on the application, the processor 120 executes the application based on the information on the application. For instance, when a user input for the text input occurs while a specific application (e.g., a messenger application) is in progress in the first electronic device 410, the first electronic device 410 provides a keypad that is provided by the executed application. In this case, the processor 120 executes the specific application, and configures an input window and a keypad in relation to the specific application. That is, the processor 120 provides the input window and the keypad that are provided by the specific application.

In step 1030, the processor 120 displays a user interface (e.g., a text input screen) that contains the configured input window and keypad. The processor 120 displays the text input screen on the user interface that has been executed or displayed before receiving the supplementary information. That is, the processor 120 may automatically display the text input screen without a separate confirmation of the user when the supplementary information is received. Alternatively, the processor 120 allows an icon to flash to indicate the reception of the supplementary information, or displays a pop-up window informing of the reception of the supplementary information. At this time, if the icon is selected by the user, or if a confirmation (or Yes) button in the pop-up window is selected, the processor 120 displays the text input screen. That is, after the processor 120 receives the supplementary information, the processor 120 displays the text input screen only when the user's request is received.

In step 1040, the processor 120 receives a text input through the displayed keypad. When the user presses (or touches) and selects a key on the keypad, the processor 120 inputs the character corresponding to the selected key.

In step 1050, the processor 120 displays the input text on the input window.

In step 1060, the processor 120 transmits the input text to the first electronic device 410. The processor 120 transmits, to the first electronic device 410, each character in real time whenever the character is input into the input window, or transmits, to the first electronic device 410, the input text in its entirety after the text input is completed. When transmitting the text, the processor 120 may encrypt the text according to the security level contained in the supplementary information to then be transmitted. If the text input is completed, the processor 120 makes a control to remove the input window and the keypad displayed in the screen. That is, the processor 120 removes the text input screen, and returns the user interface to the state prior to the reception of the supplementary information.

Accordingly, the user may simultaneously recognize the text that is input through the input window of the second electronic device 420 while inputting the text through the keypad of the second electronic device 420.

Figure 11:
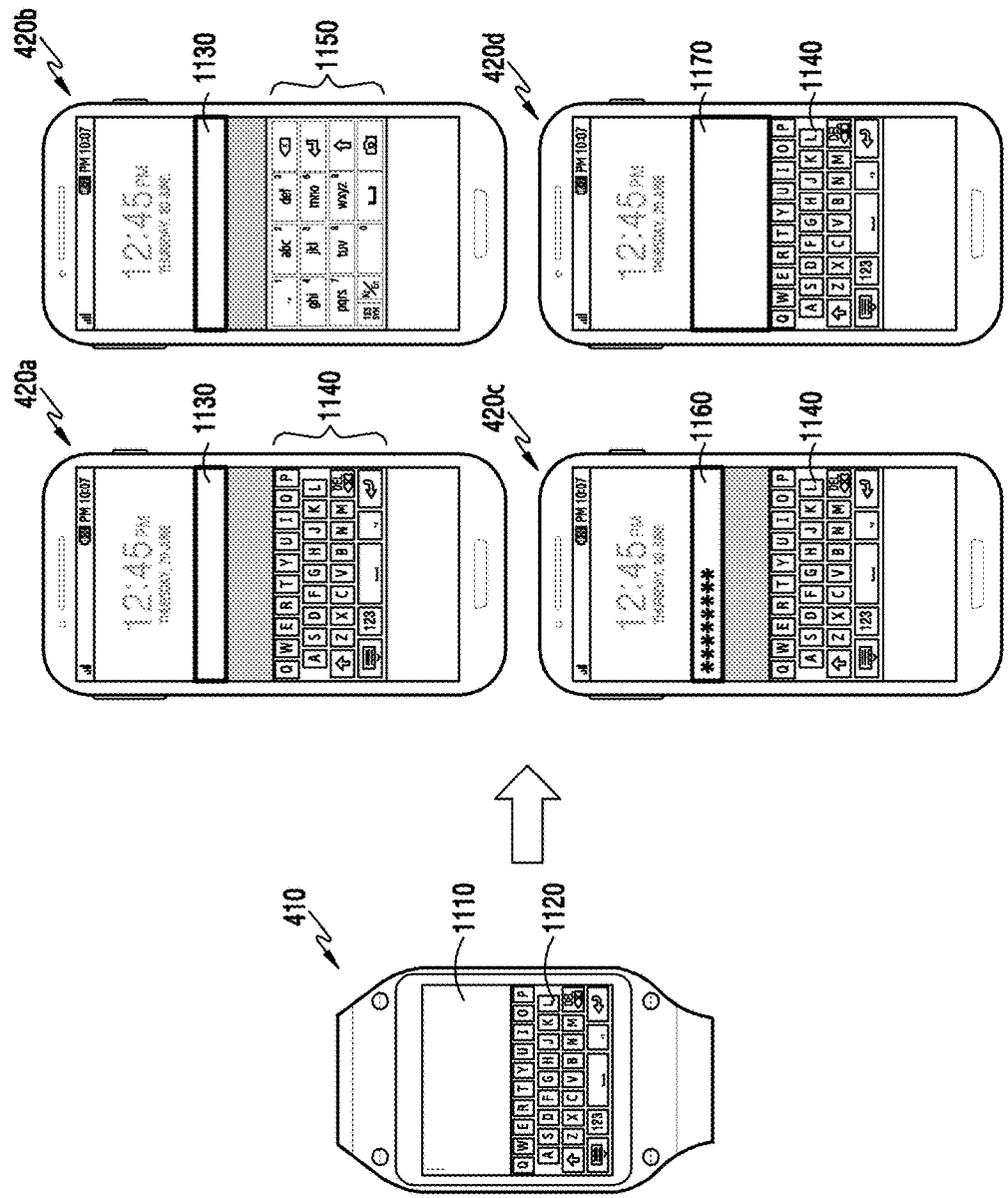
FIG. 11 illustrates a text input screen of s second electronic device, according to an embodiment of the present disclosure.

FIG. 11 illustrates a text input screen of a second electronic device, according to an embodiment of the present disclosure.

Referring to FIG. 11, a first electronic device 410 and various configurations of a second electronic device 420, such as second electronic device 420a, 420b, 420c, and 420d are provided. The second electronic device 420 configures a text input screen based on an input window 1110 and a keypad 1120, which are related to the first electronic device 410.

The input window 1130 and a keypad 1140 of the second electronic device 420a may be configured differently from the input window 1110 and the keypad 1120 of the first electronic device 410. For example, the keypad 1120 of the first electronic device 410 may be configured in English, whereas the keypad 1140 of the second electronic device 420a may be configured with numbers and in English. In addition, input window 1130 of the second electronic device 420a may be configured to be smaller than the input window 1110 of the first electronic device 410.

Alternatively, the keypad 1150 of the second electronic device 420b may be configured as a Cheonjiin type of keypad (e.g., configured with Korean alphabet), while the keypad 1120 of the first electronic device 410 may be configured as a QWERTY type of keypad, while.

Alternatively, the input window 1160 of the second electronic device 420c may be configured as a password type of input window, while the input window 1110 of the first electronic device 410 may be configured as a normal-input type of input window. When displaying the text, the password type of input window 1160 may convert the input characters into the special symbols (e.g., * or #) to then display the same so that the input characters are hidden. The normal-input type of input window 1110 displays the input text as it is without such a conversion.

Alternatively, the input window 1170 of the second electronic device 420d may be configured to have the same size as the input window 1110 of the first electronic device 410.

Figure 12:
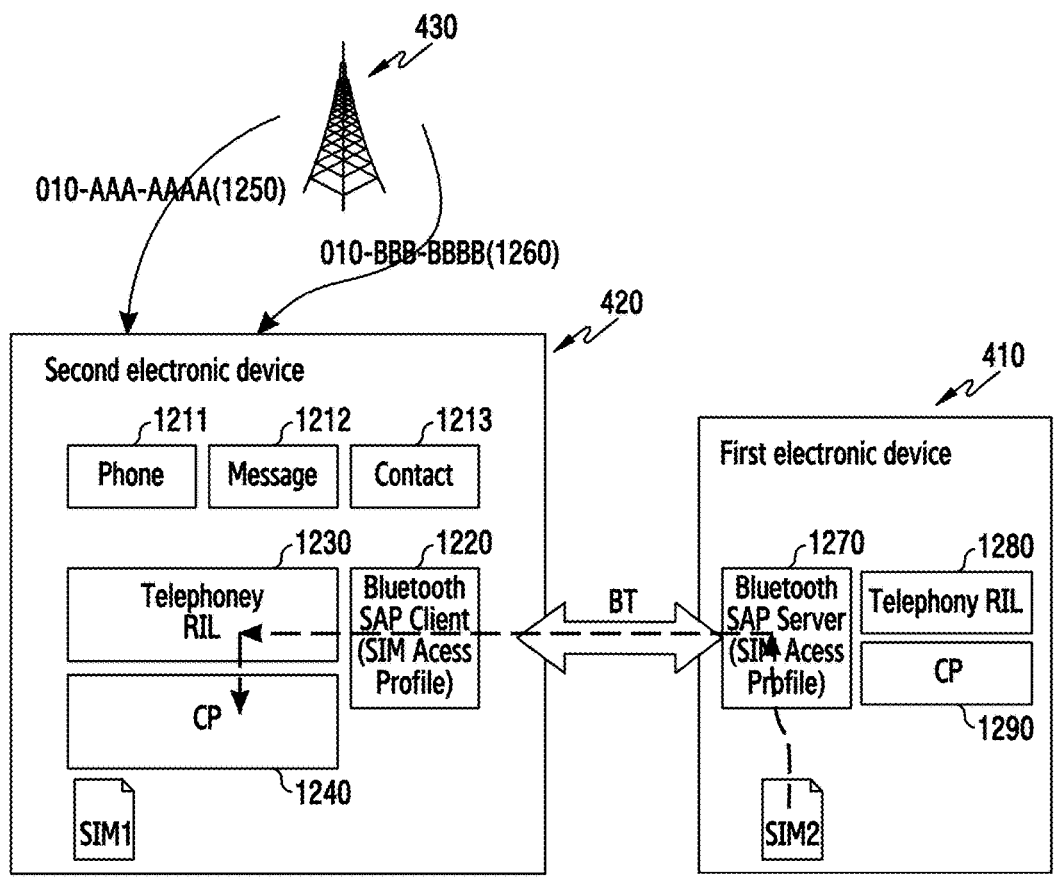
FIG. 12 illustrates a configuration of a first electronic device and a second electronic device operating in a dual SIM mode, according to an embodiment of the present disclosure.

FIG. 12 illustrates a configuration of a first electronic device and a second electronic device operating in a dual SIM mode, according to an embodiment of the present disclosure.

Referring to FIG. 12, a method of operating the first electronic device 410 and the second electronic device 420 in a dual SIM mode is provided. In the case of inputting the text in the second electronic device 420 when the text input request occurs in the first electronic device 410, the usability may be further extended by operating the first electronic device 410 and the second electronic device 420 in a virtual dual SIM mode. That is, in the case where the first electronic device 410 and the second electronic device 420 each have a SIM (i.e., the identification number (e.g., the telephone number)), the virtual dual SIM mode refers to an operating method in which the second electronic device 420 can perform communication (e.g., calls or messages) by using the identification number of the first electronic device 410. Generally, since the first electronic device 410 consumes more power than the second electronic device 420, the first electronic device 410 mostly remains in the power-off state when it is not in use. In case the user wishes to communicate (transmit/receive calls) by using the telephone number 1250 (e.g., 010-AAA-AAAA) of the first electronic device 410 even when the first electronic device 410 is turned off, the second electronic device 420 may register the telephone number 1250 of the first electronic device 410 as virtual SIM information when the second electronic device 420 is connected with the first electronic device 410 in a companion mode. For example, the first electronic device 410 includes a telephony Radio Interface Layer (RIL) 1280, a CP 1290 (e.g., the processor 120 of FIG. 1), and a Bluetooth SIM Access Profile (SAP) server 1270, and transfers the SIM information (SIM2) of the first electronic device 410 to the second electronic device 420 through the Bluetooth SAP server 1270. The second electronic device 420 receives the SIM information (SIM2) of the first electronic device 410 through a Bluetooth SAP client 1220. A CP 1240 (e.g., the processor 120 of FIG. 1) receives the SIM information (SIM2) of the first electronic device 410 through the telephony RIL 1230, and stores the same in a memory (e.g., the memory 130 of FIG. 1).

The second electronic device 420 may usually operate in a single SIM mode (e.g., SIM1), and may operate in the virtual dual SIM mode (e.g., SIM1 and SIM2) in order to thereby transmit calls by using the telephone number 1250 of the first electronic device 410 only when the user's request is received (receiving calls is similar). As described above, the operation of transmitting the SIM information (SIM2) of the first electronic device 410 to the second electronic device 420 may be similar to the method in which the SIM information of a terminal is transmitted to Car-Kit™ when a terminal is connected to the Car-Kit™ that includes a modem, and then the modem of the Car-Kit™ is used.

In the case of operating in the virtual dual SIM mode, when the second electronic device 420 performs communication (reception/transmission of calls), such as a phone 1211, message 1212, or contact 1213, the second electronic device 420 receives the user's selection for whether the telephone number 1250 (e.g., 010-AAA-AAAA) of the first electronic device 410 is to be transmitted to the base station 430 or the telephone number 1260 (e.g., 010-BBB-BBBB) of the second electronic device 420 is to be transmitted to the base station 430.

Considering the general usability, the most intuitive way to transmit calls may be by using the first electronic device 410 when transmitting calls by using the telephone number of the first electronic device 410. That is, although the SIM information of the first electronic device 410 may be registered in the second electronic device 420 in consideration of the power consumption issue of the first electronic device 410, the user may actually be more likely to use the first electronic device 410.

Figure 13:
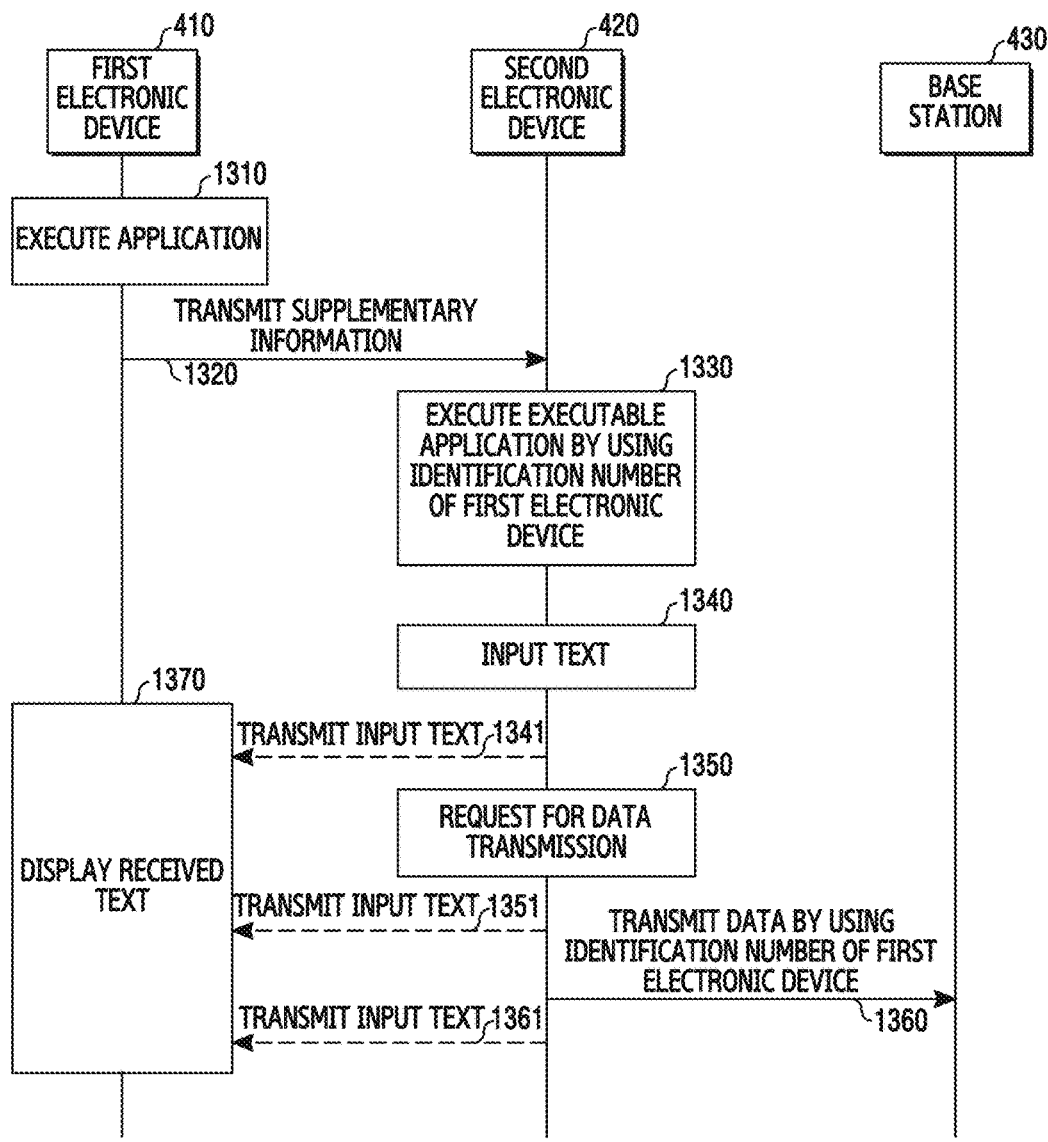
FIG. 13 is a signal flow diagram for a method of processing inputs between a first electronic device and a second electronic device in a dual SIM mode, according to an embodiment of the present disclosure.

FIG. 13 is a signal flow diagram of a method for processing inputs between a first electronic device and a second electronic device in a dual SIM mode, according to an embodiment of the present disclosure.

Referring to FIG. 13, in step 1310, the first electronic device 410 executes one or more applications according to a user's request. For example, the first electronic device 410 executes an application that transmits one or more pieces of data to a third electronic device (e.g., the external electronic device 104 or 106, or the server 106 in FIG. 1), such as calls or messages, according to the user's request (e.g., the selection of the application). When the application is executed, the first electronic device 410 determines that a user input event for the text input (e.g., a text input event) has been detected.

In step 1320, the first electronic device 410 transmits supplementary information related to the text input event to the second electronic device 420. That is, when the text input event is detected, the first electronic device 410 displays a keypad for the text input on the screen. The keypad may be an IME that is provided by the executed application. In addition, the first electronic device 410 creates supplementary information that is related to the text input event to the second electronic device 420. The supplementary information may contain at least one of the type of keypad, the type of input item, keypad language, the security level, the requested text string length, the maximum enterable length, the non-enterable characters, the text that is pre-input into the input window, or information on the application.

In step 1330, the second electronic device 420 receives the supplementary information, and executes an application that is executable according to the identification number (e.g., telephone number) of the first electronic device 410 based on the supplementary information. The supplementary information may contain information on the application, wherein the information on the application may be information on the application that has been executed in the first electronic device 410. The information on the application may contain a variety of information, such as the identification number, the name, the code, or the type of keypad of the executed application. The second electronic device 420 executes the same application as has been executed in the first electronic device 410 based on the information on the application.

In step 1340, the second electronic device 420 receives input text through the executed application. For example, if the executed application is a "call" application, the second electronic device 420 displays a keypad that is configured with number keys, and receives numbers corresponding to the number keys on the keypad. The user selects (e.g., presses) the number keys on the keypad in order to input a phone number for a third electronic device. Alternatively, the second electronic device 420 may provide a contact list, and may receive the selection for the telephone number of the third electronic device from the contact list. Alternatively, if the executed application is a "message" application, the second electronic device 420 displays the QWERTY type of keypad, and receives text inputs corresponding to the keys on the keypad.

In step 1350, when the text input is completed, the second electronic device 420 makes a request by a user, to the first electronic device 410, for the transmission of at least some data by using the identification number of the first electronic device 410 based on the input text. For example, in the case of the "call" application, the second electronic device 420 makes a request for a phone-call corresponding to the input number (e.g., the telephone number input by the user), using the identification number of the first electronic device 410. Alternatively, in the case of the "message" application, the second electronic device 420 makes a request for the transmission of a message that is comprised of the content of the input text.

In step 1360, the second electronic device 420 transmits at least some data to a base station 430 by using the identification number of the first electronic device 410. That is, the second electronic device 420 transfers, to the base station 430, the identification number of the first electronic device 410 and the identification number of the third electronic device which was input in the input text, as the data. Since the second electronic device 420 performs the text input by the request of the first electronic device 410, the second electronic device 420 may automatically transmit calls by using the identification number of the first electronic device 410 without a separate user input. Alternatively, the second electronic device 420 may receive the user's selection for whether the identification number of the first electronic device 410 is to be used for the caller identification or the identification number of the second electronic device 420 is to be used for the caller identification. The second electronic device 420 may then transmit calls by using the selected identification number.

In the case where the second electronic device 420 directly transmits the data, the time when the second electronic device 420 transmits the input text to the first electronic device 410 may be different. For example, in step 1341, the second electronic device 420 may transmit, to the first electronic device 410, the input text at the same time the text is input, or may alternatively transmit, to the first electronic device 410, the input text when the text input is completed. Alternatively, when the request for the data transmission is received by the first electronic device 410, the second electronic device 420 may transmit the input text to the first electronic device 410 in step 1351. Alternatively, after performing the data transmission to the base station 430, the second electronic device 420 may transmit the input text to the first electronic device 410 in step 1361. Alternatively, the second electronic device 420 may not transmit the input text to the first electronic device 410. The second electronic device 420 may encrypt and transmit the text when transmitting the text. The second electronic device 420 may transmit the text through the IME, or may transmit the text through the executed application.

In step 1370, the first electronic device 410 receives the text from the second electronic device 420, and displays the received text. The first electronic device 410 may decrypt the received text to then be displayed.

Figure 14:
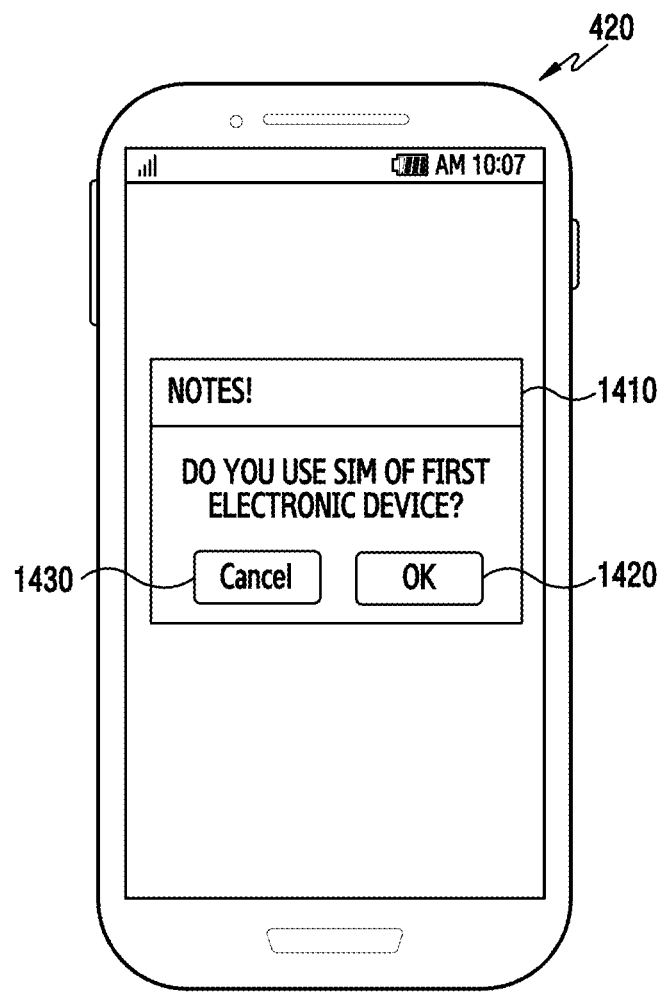
FIG. 14 illustrates a caller identification selection screen of a second electronic device in a dual SIM mode, according to an embodiment of the present disclosure.

FIG. 14 illustrates a caller identification selection screen of a second electronic device in the dual SIM mode, according to an embodiment of the present disclosure.

Referring to FIG. 14, when performing the transmission of calls after inputting the text by the request of the first electronic device 410, the second electronic device 420 may receive the selection of the caller identification from the user. For example, when a request for the data transmission (e.g., the transmission of calls) is received, the second electronic device 420 displays a pop-up window 1410 to confirm whether the identification number (e.g., the phone number) of the first electronic device 410 is to be used as the caller identification. When the user selects OK 1420, the second electronic device 420 transmits calls by using the identification number of the first electronic device 410. When the user selects Cancel 1430, the second electronic device 420 transmits calls by using the identification number of the second electronic device 420. Alternatively, since the text input is requested by the first electronic device 410, the second electronic device 420 may automatically transmit calls by using the identification number of the first electronic device 410 without a separate user input confirmation.

Figure 15A:
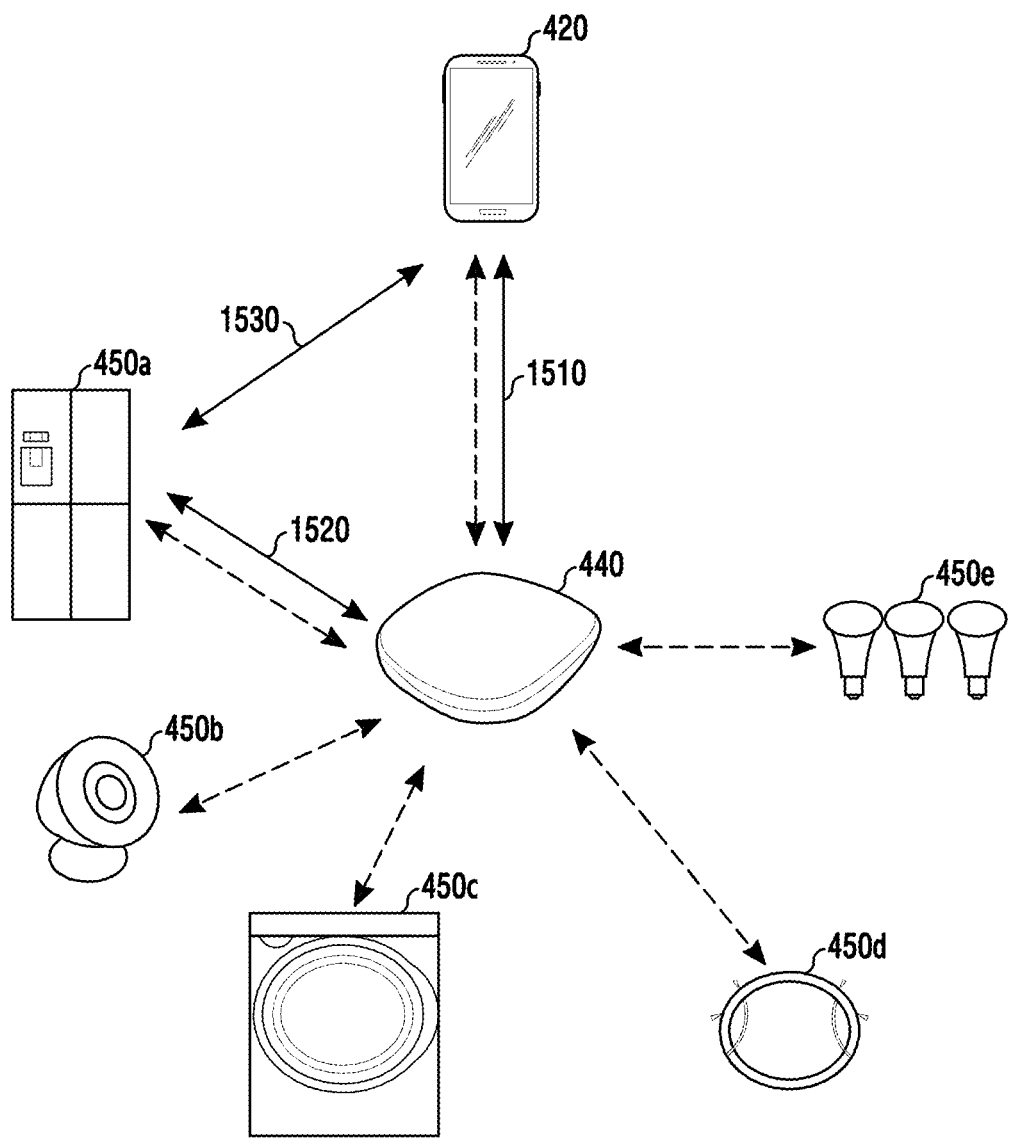
FIGS. 15A and 15B illustrate a method of operating a first electronic device and a second electronic device in an Internet of Things (IoT) environment, according to an embodiment of the present disclosure.
Figure 15B:
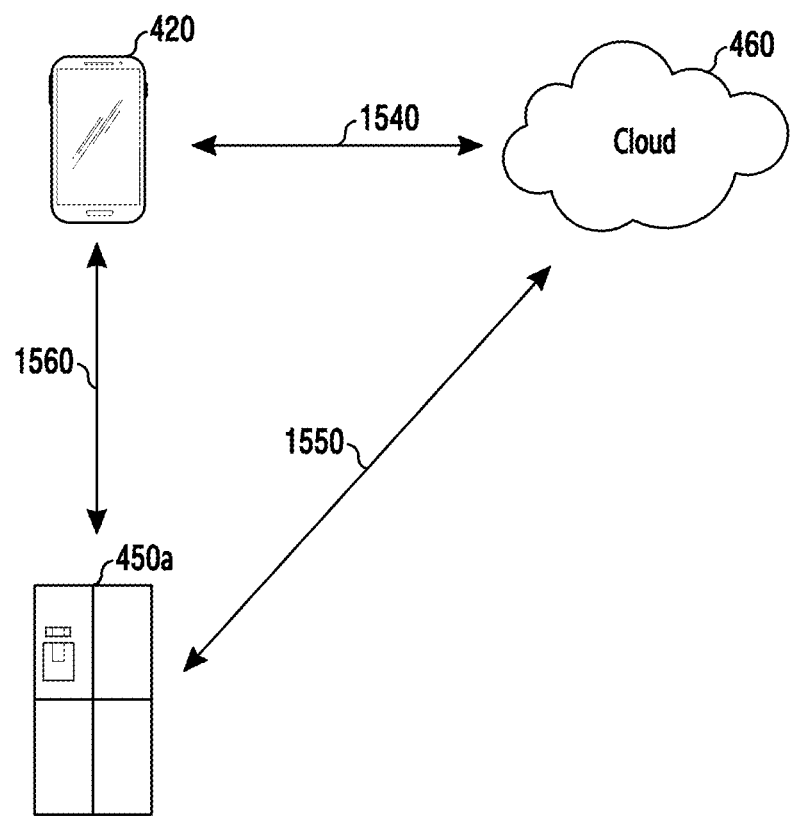

FIGS. 15A and 15B illustrate a method of operating a first electronic device and a second electronic device in an Internet of Things (IoT) environment, according to an embodiment of the present disclosure.

Referring to FIGS. 15A and 15B, the present disclosure may be effectively applied to in an IoT environment. When a user input is required to change the configuration or the display of text, it is likely that the IoT devices do not have their own input method editors. In this case, if it is possible to change the configuration of the IoT devices or to input text into the IoT device from the outside, the IoT devices may be more easily controlled.

Referring to FIG. 15A, the first electronic device 410 includes devices that may be utilized in a home network. The home network refers to a technique for controlling home appliances, and information and communication equipment at home, and for allowing the devices to share content with each other. For example, the first electronic device 410 may be at least one of a refrigerator 450a, a CCTV 450b, a washing machine 450c, a robot cleaner 450d, or light bulbs 450e. The first electronic device 410 may be connected with the second electronic device 420 through a hub device 440. Alternatively, the first electronic device 410 can be directly connected with the second electronic device 420 without the hub device 440. The hub device 440 may provide a configuration page for controlling the first electronic device 410, such as the refrigerator 450a, the CCTV 450b, the washing machine 450c, the robot cleaner 450d, or the light bulbs 450e, individually or collectively. The second electronic device 420 may access the hub device 440 to display the configuration page, receive, from the user, a selection for the first electronic device 410 that is desired to be controlled in the configuration page, and change the configuration or the text display of the selected first electronic device 410.

To this end, in step 1510, the second electronic device 420 may register its own device information (e.g., the name, the identification number, the supportable functions, etc.) in the hub device 440. Here, the supportable functions may include a remote text input function (i.e., the method of processing inputs between the devices as described above). When the device information is registered in the hub device 440, the second electronic device 420 is authorized to access the configuration page that is provided by the hub device 440. In addition, the second electronic device 420 may install a manager or applications in relation to the configuration page.

In step 1520, when a user's touch is detected, or when a specific button is selected, the refrigerator 450a transmits a text input event to the hub device 440. The text input event may be a user input for the text input. The hub device 440 receives the text input event, and informs the second electronic device 420 of the reception of the text input event.

Alternatively, in step 1530, when a user's touch is detected or a specific button is selected, the refrigerator 450*a* may directly transmit the text input event to the second electronic device 420 without passing through the hub device 440.

The second electronic device 420 displays the configuration page according to the text input event. The second electronic device 420 may select the refrigerator 450*a* in the configuration page, or a page related to the refrigerator 450*a* may be automatically displayed as the configuration page. The second electronic device 420 may change the configuration related to the refrigerator 450*a* (e.g., the temperature control, the lock status, the mode selection, etc.) according to a user input, and transmit the changed details to the hub device 440. Alternatively, the second electronic device 420 may directly transmit the changed details to the refrigerator 450*a* to change the configuration of the refrigerator 450*a*. The hub device 440 changes the configuration of the refrigerator 450*a* according to the changed details.

Referring to FIG. 15B, the first electronic device 410 that includes at least one of the refrigerator 450*a*, the CCTV 450*b*, the washing machine 450*c*, the robot cleaner 450*d*, or the lights 450*e*, may be registered in a cloud 460. A user account of the first electronic device 410 may be registered in the cloud 460. Like the hub device 440 of FIG. 15A, the cloud 460 may provide a configuration page for changing the configuration or the text display of the first electronic device 410. In addition, the second electronic device 420 may be registered in the cloud 460 as well.

When the second electronic device 420 is registered in the cloud 460, access information of the second electronic device 420, such as the MAC address or the BT address, may be registered. In this case, the first electronic device 410, which requires the remote text input, may directly search for the second electronic device 420 that can perform the remote text input. In addition, a user account of the second electronic device 420 may be registered in the cloud 460 as well. If the user of the first electronic device 410 is the same as the user of the second electronic device 420, the user accounts thereof may also be identical to each other. In this case, when a text input event is received from the first electronic device 410, the cloud 460 performs a search based on the user account of the first electronic device 410. The cloud 460 provides, as a device for the text input, the second electronic device 420 that has the same user account as the first electronic device 410.

For example, in step 1550, when a user's touch is detected or a specific button is selected, the refrigerator 450*a* transmits a text input event to the cloud 460. In step 1540, the cloud 460 searches for a nearby device that can perform the text input (e.g., the second electronic device 420), and makes a request to the second electronic device 420 for the text input. Alternatively, in step 1560, when a user's touch is detected or a specific button is selected, the refrigerator 450*a* may search for a nearby device that can perform the text input (e.g., the second electronic device 420), and transmits the text input event to the discovered second electronic device 420.

The second electronic device 420 displays a configuration page according to the text input event. The second electronic device 420 selects the refrigerator 450*a* in the configuration page, or a page related to the refrigerator 450*a* may automatically be displayed as the configuration page. The second electronic device 420 changes the configuration related to the refrigerator 450*a* (e.g., the temperature control, the lock status, the mode selection, etc.) according to the user input, and transmits the changed details to the cloud 460. Alternatively, the second electronic device 420 may directly transmit the changed details to the refrigerator 450*a* to change the configuration of the refrigerator 450*a*. The cloud 460 changes the configuration of the refrigerator 450*a* according to the changed details.

An operating method of a wearable device that includes the first display having the first size includes displaying, through at least some of the first display, a user interface for obtaining a text input from the user; transmitting, to an external device that includes the second display that has a second size larger than the first size, a request for obtaining the text input through the external device; receiving, from the external device, input information that is obtained in relation to the text input through the external device; and displaying the received input information in at least some of the user interface.

The operating method of the wearable device may further include displaying an input window and a keypad as the user interface; deactivating the keypad; and displaying the received input information in the input window.

Displaying in the input window includes activating a keypad when it is determined that the reception of the input information is completed.

Transmitting the request includes creating supplementary information that is related to the text input in response to a user input with respect to the user interface; and transmitting the created supplementary information to the external device.

The supplementary information includes at least one of the type of keypad related to text input, the type of input item, keypad language, the security level, the requested text string length, the maximum enterable length, the non-enterable characters, the text that is pre-input into the input window, or information on an application.

An operating method of an electronic device that includes the first display having the first size includes receiving, from an external device that includes the second display that has a second size that is smaller than the first size, a request for obtaining a text input from a user and supplementary information that is related to the text input; displaying, through at least some of the first display, a user interface for obtaining the text input; and in response to the reception of input information in relation to the user interface, transmitting the received input information to the external device.

Displaying the user interface may further include configuring the user interface based on at least one of the type of keypad, the type of input item, keypad language, the security level, the requested text string length, the maximum enterable length, the non-enterable characters, the text that is pre-input into the input window, or information on an application, which are received as the supplementary information.

Transmitting the input information includes transmitting the input information to the external device whenever a character is input, or transmitting the input information to the external device when the text input is completed.

The operating method of the electronic device may further include removing the displayed user interface when the text input is completed.

The operating method of the electronic device may further include storing the identification number of the external device in a memory; executing an executable application based on the identification number of the external device according to the request; and transmitting at least some data by using the identification number of the external device based on the input information that is received through the user interface.

According to an embodiment of the present disclosure, the aforementioned hardware device may be configured to operate as one or more software modules in order to perform the operation of the present disclosure, and vice versa. The modules or programming modules may include at least one of the above described elements, exclude some of the elements, or further include other additional elements. The operations performed by the modules, programming module, or other elements may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help in understanding of the present disclosure, and are not intended to limit the scope of the present disclosure. Therefore, it should be construed that all modifications and changes or modified and changed forms based on the technical idea of the present disclosure fall within the scope of the present disclosure. Therefore, the scope of the present disclosure is defined, not by the detailed description and embodiments, but by the following claims and their equivalents.

What is claimed is:

1. A wearable device that can be attached to or detached from a user, the wearable device comprising:
a first display having a first size;
a processor; and
a memory storing instructions thereon that, when executed, allow the processor to:
display, through the first display, a user interface including a first keypad;
obtain a first text input through the first keypad;
display at least one first text corresponding to the first text input in the user interface;
transmit, to an external device that includes a second display having a second size, a request for obtaining a second text input through a second keypad displayed on the second display of the external device and supplementary information related to the first text input, the supplementary information including a type of the first keypad in the user interface and the at least one first text displayed in the user interface;
receive, from the external device, the second text input obtained through the second keypad, wherein a type of the second keypad is identified as the type of the first keypad based on the supplementary information, and wherein the at least one first text is displayed with the second keypad based on the supplementary information; and
display, through the first display, at least one second text corresponding to the second text input received from the external device, next to the at least one first text in the user interface, wherein the first keypad in the user interface is in an active state capable of obtaining a third text input while receiving the second text input.

2. The device of claim 1, wherein the processor changes the type of the first keypad displayed in the first display to another type, in response to the transmission of the request and the supplementary information.

3. The device of claim 1, wherein the processor, in response to the transmission of the request and the supplementary information, deactivates the first keypad and displays the at least one second text in an input window of the first display.

4. The device of claim 1, wherein the processor transmits the request and the supplementary information to the external device in response to a user input in the user interface.

5. The device of claim 1, wherein the supplementary information further includes at least one of a type of input item, a keypad language, a security level, a requested text string length, a maximum enterable length, non-enterable characters, text that is pre-input into an input window, and information on an application.

6. The device of claim 1, wherein the processor receives the second text input in real time from the external device, or receives the second text input from the external device when the second text input is completed.

7. The device of claim 1, wherein the first size is less than the second size.

8. An electronic device comprising:
a first display having a first size;
a processor; and
a memory storing instructions thereon that when executed allow the processor to:
receive, from an external device that includes a second display having a second size and that displays a user interface including a first keypad for obtaining a first text input through the second display, a request for obtaining a second text input and supplementary information related to the first text input, the supplementary information including a type of the first keypad in the user interface and at least one first text displayed in the user interface according to the first text input;
display, through the first display, the at least one first text and a second keypad for obtaining the second text input, wherein a type of the second keypad is identified as the type of the first keypad based on the supplementary information;
obtain the second text input through the second keypad; and
transmit the obtained second text input to the external device,
wherein at least one second text corresponding to the second text input is displayed next to the at least one first text in the user interface of the external device, and
wherein the first keypad is in an active state capable of obtaining a third text input while transmitting the obtained second text input.

9. The device of claim 8, wherein the supplementary information further includes at least one of a type of input item, a keypad language, a security level, a requested text string length, a maximum enterable length, non-enterable characters, and information on an application.

10. The device of claim 8, wherein the processor transmits the second text input obtained through the second keypad to the external device when a character of the at least one second text is input, or when the second text input is completed.

11. The device of claim 8, wherein the processor removes the second keypad that is displayed on the first display when the second text input through the second keypad is completed.

12. The device of claim 8, wherein the memory stores an identification number of the external device, and
the processor:
executes an application based on the identification number of the external device according to the request, and transmits data by using the identification number of the external device, based on the second text input obtained through the second keypad.

13. A method of a wearable device that includes a first display having a first size, the method comprising:
- displaying, through the first display, a user interface including a first keypad;
- obtaining a first text input through the first keypad;
- displaying at least one first text corresponding to the first text input in the user interface;
- transmitting, to an external device that includes a second display having a second size, a request for obtaining a second text input through a second keypad displayed on the second display of the external device and supplementary information related to the first text input, the supplementary information including a type of the first keypad in the user interface and the at least one first text displayed in the user interface;
- receiving, from the external device, the second text input obtained through the second keypad, wherein a type of the second keypad is identified as the type of the first keypad based on the supplementary information, and wherein the at least one first text is displayed with the second keypad based on the supplementary information; and
- displaying, through the first display, at least one second text corresponding to the second text input received from the external device, next to the at least one first text in the user interface, wherein the first keypad in the user interface is in an active state capable of obtaining a third text input while receiving the second text input.

14. The method of claim 13, further comprising:
- in response to the transmission of the request and the supplementary information, deactivating first the keypad; and
- displaying the at least one second text in an input window of the first display.

15. The method of claim 13, further comprising changing the type of the first keypad displayed in the first display to another type, in response to the transmission of the request and the supplementary information.

16. The method of claim 13, wherein transmitting the request and the supplementary information comprises:
- creating the supplementary information in response to a user input in the user interface; and
- transmitting the request and the created supplementary information to the external device.

17. The method of claim 13, wherein the supplementary information further includes at least one of a type of input item, a keypad language, a security level, a requested text string length, a maximum enterable length, non-enterable characters, and information on an application.

* * * * *